US012795494B2

(12) United States Patent
Yu et al.

(10) Patent No.: US 12,795,494 B2
(45) Date of Patent: Nov. 10, 2026

(54) CELL RESELECTION METHOD AND APPARATUS

(71) Applicant: HUAWEI TECHNOLOGIES CO., LTD., Shenzhen (CN)

(72) Inventors: Yingjie Yu, Shanghai (CN); Yi Wang, Shanghai (CN); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 18/600,562

(22) Filed: Mar. 8, 2024

(65) Prior Publication Data

US 2024/0214893 A1 Jun. 27, 2024

Related U.S. Application Data

(63) Continuation of application No. PCT/CN2022/117506, filed on Sep. 7, 2022.

(30) Foreign Application Priority Data

Sep. 18, 2021 (CN) .......................... 202111112845.6

(51) Int. Cl.
*H04W 36/32* (2009.01)
*H04L 5/00* (2006.01)
(Continued)

(52) U.S. Cl.
CPC ......... *H04W 36/322* (2023.05); *H04L 5/0051* (2013.01); *H04W 4/02* (2013.01); *H04W 36/0061* (2013.01); *H04W 52/0235* (2013.01); *H04W 52/0245* (2013.01); *H04W 64/00* (2013.01); *H04W 36/08* (2013.01); *Y02D 30/70* (2020.08)

(58) Field of Classification Search
CPC ............ H04L 5/0051; H04W 35/0061; H04W 35/322; H04W 35/08; H04W 4/02; H04W 52/0235; H04W 52/0245; H04W 64/00
See application file for complete search history.

(56) References Cited

U.S. PATENT DOCUMENTS

2020/0305039 A1 9/2020 Jung
2022/0116089 A1* 4/2022 Khoryaev ............. H04W 64/00
2023/0051569 A1* 2/2023 Jiang ..................... H04W 48/20

FOREIGN PATENT DOCUMENTS

CN 104980888 A 10/2015
CN 105589506 A 5/2016
(Continued)

OTHER PUBLICATIONS

Huawei, HiSilicon:"NR LPHAP and other NR positioning enhancements", 3GPP TSG RAN Rel-18 workshop, Electronic Meeting, Jun. 28-Jul. 2, 2021, RWS-210443, XP052025995, total 6 pages.
(Continued)

*Primary Examiner* — Matthew E Heneghan

(57) ABSTRACT

This application discloses a cell reselection method and an apparatus. The method includes: A terminal receives first indication information indicating one or more positioning areas, each of the one or more positioning areas includes a plurality of cells having same resource configuration information; and the terminal performs cell reselection in accordance with the first indication information to reselect a cell in the positioning area.

20 Claims, 8 Drawing Sheets

(51) Int. Cl.

| | |
|---|---|
| ***H04W 4/02*** | (2018.01) |
| ***H04W 36/00*** | (2009.01) |
| ***H04W 36/08*** | (2009.01) |
| ***H04W 52/02*** | (2009.01) |
| ***H04W 64/00*** | (2009.01) |

(56) References Cited

FOREIGN PATENT DOCUMENTS

| | | | | |
|---|---|---|---|---|
| CN | 111343567 A | | 6/2020 | |
| CN | 114697993 A | | 7/2022 | |
| EP | 4096305 A1 | | 11/2022 | |
| JP | 2018137688 A | | 8/2018 | |
| WO | WO-2019192000 A1 | * | 10/2019 | ............ H04W 36/00 |
| WO | 2021146856 A1 | | 7/2021 | |
| WO | 2022141099 A1 | | 7/2022 | |

OTHER PUBLICATIONS

3GPP TS 38.305 V15.0.0 (Jun. 2018):"3rd Generation Partnership Project; Technical Specification Group Radio Access Network;NG Radio Access Network (NG-RAN); Stage 2 functional specification of User Equipment (UE) positioning in NG-RAN(Release 15)", total 57 pages.

3GPP TS 38.455 V15.0.0 (Jun. 2018):"3rd Generation Partnership Project; Technical Specification Group Radio Access Network;NG-RAN;NR Positioning Protocol A (NRPPa) (Release 15)", total 60 pages.

3GPP TS 38.455 V16.1.0 (Sep. 2020):"3rd Generation Partnership Project;Technical Specification Group Radio Access Network; NG-RAN;NR Positioning Protocol A (NRPPa) (Release 16)", total 147 pages.

3GPP TS 38.305 V16.2.0 (Sep. 2020):"3rd Generation Partnership Project; Technical Specification Group Radio Access Network;NG Radio Access Network (NG-RAN);Stage 2 functional specification ofUser Equipment (UE) positioning in NG-RAN(Release 16)", total 117 pages.

3GPP TS 37.355 V16.3.0 (Dec. 2020):"3rd Generation Partnership Project; Technical Specification Group Radio Access Network;LTE Positioning Protocol (LPP)(Release 16)", total 295 pages.

* cited by examiner

CELL RESELECTION METHOD AND APPARATUS

CROSS-REFERENCE TO RELATED APPLICATIONS

This application is a continuation of International Application No. PCT/CN2022/117506, filed on Sep. 7, 2022, which claims priority to Chinese Patent Application No. 202111112845.6, filed on Sep. 18, 2021. The disclosures of the aforementioned applications are hereby incorporated by reference in their entireties.

TECHNICAL FIELD

This application relates to the field of communication technologies, and in particular, to a cell reselection method and an apparatus.

BACKGROUND

In an existing uplink positioning procedure, a serving base station configures, for a terminal, a resource (also referred to as an SRS resource) used to send a sounding reference signal (SRS), and the serving base station notifies the terminal of the SRS resource. The terminal may send the SRS on the SRS resource for subsequent positioning.

Generally, an SRS resource is configured based on a cell level, in other words, an SRS resource is configured for each cell. When the terminal is in an inactive state, the terminal performs periodic radio resource management (RRM) measurement on a neighboring cell, and selects a cell with a high reference signal received power (RSRP) according to a particular rule, to ensure communication quality of the terminal. This process is referred to as a cell reselection process. In the cell reselection process, an SRS resource configured by the serving base station for a current cell is released. After the terminal reselects a target cell, the terminal re-establishes a radio resource control (RRC) connection to the target cell, and the terminal obtains an SRS resource configured for the target cell, to send an SRS on the SRS resource.

In the foregoing cell reselection process, the terminal needs to re-establish the RRC connection to the target cell, and re-obtain the SRS resource. As a result, power consumption of the terminal is increased, and battery power consumption is high. This is contrary to a low power consumption requirement of the terminal.

SUMMARY

This application provides a cell reselection method and an apparatus, so that after reselecting a cell, a terminal can complete a positioning procedure based on an obtained SRS resource without needing to re-establish an RRC connection or re-obtain an SRS resource, to decrease power consumption of the terminal and satisfy a low power consumption requirement of the terminal.

According to a first aspect, a cell reselection method is provided. The method may be performed by a first communication apparatus. The first communication apparatus may be a communication device; or may be a communication apparatus, for example, a chip system, that can support a communication device in implementing functions required in the method. The following uses an example in which the communication device is a terminal for description.

The terminal receives first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by the terminal to send a reference signal, and the reference signal is used to determine a location of the terminal. The terminal performs cell reselection in the positioning area indicated by the first indication information, and the terminal reselects the cell included in the positioning area. The terminal performs cell reselection in the positioning area indicated by the first indication information. Candidate cells may include the cell in the positioning area and a cell outside the positioning area. According to the solution provided in this embodiment of this application, after finally performing a cell reselection procedure, the terminal can reselect the cell included in the positioning area. It can be learned from the solution provided in the first aspect that, when performing cell reselection in the cell in the positioning area, a network device can reselect the cell in the positioning area, and does not reselect the cell outside the positioning area. In this manner, it is ensured that the terminal does not need to re-establish an RRC connection after reselecting the cell, and does not needs to frequently obtain SRS configuration information, to decrease power consumption of the terminal.

In a possible implementation of the first aspect, the method further includes: The terminal receives second indication information, where the second indication information notifies the terminal that a priority of a first-type cell is higher than a priority of a second-type cell, in other words, the second indication information is used by the terminal to learn that the priority of the first-type cell is higher than the priority of the second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area. In the cell reselection procedure, there are some scenarios in which a cell priority needs to be used. In these scenarios, the terminal reselects a cell having a highest priority in the candidate cells. Therefore, in this implementation, the priority of the first-type cell is configured to be higher than the priority of the second-type cell, to ensure that when the cell in the positioning area and the cell outside the positioning area exist in the candidate cells, the terminal can reselect the higher-priority cell in the positioning area based on the priorities of the cells. In this way, the terminal does not need to frequently obtain the reference signal resource configuration information, to decrease the power consumption of the terminal.

In a possible implementation of the first aspect, that the terminal performs cell reselection in the positioning area indicated by the first indication information, and the terminal reselects the cell included in the positioning area includes: The terminal performs cell reselection in the positioning area indicated by the first indication information, and the terminal obtains that the candidate cells include the first-type cell and the second-type cell, and the first-type cell and the second-type cell belong to inter-frequency cells having different priorities or belong to inter-radio access technology RAT cells. The terminal reselects, between the first-type cell and the second-type cell, the first-type cell having the higher priority. In the cell reselection procedure, when the candidate cells belong to the inter-frequency cells having the different priorities or the inter-RAT cells, priorities of the candidate cells need to be used, and finally, the terminal reselects a cell having a highest priority in the candidate cells. In this implementation, the priority of the first-type cell is increased, so that the terminal can reselect the cell in the positioning area, and the terminal does not need to frequently obtain the reference signal resource configuration information, to decrease the power consumption of the terminal.

In a possible implementation of the first aspect, the second indication information indicates to the terminal that a priority of a frequency of the first-type cell is higher than a priority of a frequency of the second-type cell. In this implementation, the priority of the frequency is configured, so that the terminal learns that the priority of the first-type cell is higher than the priority of the second-type cell.

In a possible implementation of the first aspect, the second indication information indicates to the terminal that a priority of an identifier of the first-type cell is higher than a priority of an identifier of the second-type cell. In other words, the second indication information indicates that a priority of a cell corresponding to a first-type identifier is higher than a priority of a cell corresponding to a second-type identifier. The first-type identifier includes an identifier of each cell in the first-type cell, and the second-type identifier includes an identifier of each cell in the second-type cell. In this implementation, the priority of the identifier of the cell is configured, so that the terminal learns that the priority of the first-type cell is higher than the priority of the second-type cell.

In a possible implementation of the first aspect, the second indication information carries a first adjustment value, the first adjustment value is used to perform an operation with a value of a first target parameter or a value of a second target parameter, to increase the value of the first target parameter or decrease the value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell. In this implementation, the priority of the first-type cell is adjusted by using the first adjustment value, to enable the priority of the first-type cell to be higher than the priority of the second-type cell; or the priority of the second-type cell is adjusted by using the first adjustment value, to enable the priority of the second-type cell to be lower than the priority of the first-type cell.

In a possible implementation of the first aspect, the second indication information is carried in a system message SIB, a position system message Pos SIB, or an RRC message. In this implementation, the second indication information may be carried in different messages. For example, a SIB or a Pos SIB carries the second indication information. Only one piece of signaling may indicate a plurality of terminals in one positioning area. The priority of the first-type cell is higher than the priority of the second-type cell. Alternatively, the second indication information may be carried in RRC signaling. In this way, a plurality of terminals in a plurality of positioning areas may be indicated, and a priority of each first-type cell is higher than a priority of a second-type cell corresponding to the first-type cell.

In a possible implementation of the first aspect, the method further includes: The terminal receives third indication information, where the third indication information notifies the terminal that an R value of a first-type cell is greater than an R value of a second-type cell. In other words, the third indication information is used by the terminal to learn that the R value of the first-type cell is greater than the R value of the second-type cell. For example, the third indication information is used by the terminal to adjust the R value, to enable the R value of the first-type cell to be greater than the R value of the second-type cell. The first-type cell includes a serving cell and a cell that is in one or more neighboring cells of the serving cell and that belongs to the positioning area, and the second-type cell is a cell that is in the one or more neighboring cells of the serving cell and that does not belong to the positioning area. In the cell reselection procedure, there are some scenarios in which an R value of a cell needs to be used. In these scenarios, the terminal reselects a cell having a largest R value in the candidate cells. Therefore, in this implementation, the R value of the first-type cell is configured to be greater than the R value of the second-type cell, to ensure that when the cell in the positioning area and the cell outside the positioning area exist in the candidate cells, the terminal can reselect the cell having the larger R value in the positioning area based on the R values of the cells. In this way, the terminal does not need to frequently obtain the reference signal resource configuration information, to decrease the power consumption of the terminal.

In a possible implementation of the first aspect, that the terminal performs cell reselection in the positioning area indicated by the first indication information, and the terminal reselects the cell included in the positioning area includes: The terminal performs cell reselection in the positioning area indicated by the first indication information, and the terminal obtains that the candidate cells include the first-type cell and the second-type cell, and the first-type cell and the second-type cell belong to inter-frequency cells having a same priority or intra-frequency cells. The terminal reselects, between the first-type cell and the second-type cell, the first-type cell having the greater R value. In the cell reselection procedure, when the candidate cells belong to the inter-frequency cells having the same priority or the intra-frequency cells, R values of the candidate cells need to be used, and finally, the terminal reselects a cell having a largest R value in the candidate cells. In this implementation, the R value of the first-type cell is increased, so that the terminal can reselect the cell in the positioning area, and the terminal does not need to frequently obtain the reference signal resource configuration information, to decrease the power consumption of the terminal.

In a possible implementation of the first aspect, the third indication information carries a second adjustment value, the second adjustment value is used to perform an operation with a value of a third target parameter or a value of a fourth target parameter, to decrease the value of the third target parameter or increase the value of the fourth target parameter, the third target parameter is a temporary offset of the first-type cell, a reselection offset of the first-type cell, or an RSRP of the first-type cell; and the fourth target parameter is a temporary offset of the second-type cell, a reselection offset of the second-type cell, or an RSRP of the second-type cell. In this implementation, a specific manner of increasing the R value of the first-type cell is provided, and correspondingly, a manner of decreasing the R value of the second-type cell is further provided, to increase diversity of the solution.

In a possible implementation of the first aspect, the second adjustment value is used to enable the operation with the value of the third target parameter to satisfy a formula:

$$Rn = Qmeas,n - Qoffset - Qoffset_{temp} + Qoffsetdeta; \text{ or}$$

$$Rn = Qmeas,n - Qoffset * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell, so that in this implementation, the general R criterion is improved, and a possible formula is provided to increase the R value of the first-type cell.

In a possible implementation of the first aspect, the third indication information is carried in a system message SIB, a position system message Pos SIB, or an RRC message.

According to a second aspect, a cell reselection method is provided. The method includes: A network device sends first indication information, where the first indication information indicates one or more positioning areas, so that a terminal performs cell reselection in the positioning area indicated by the first indication information; and reselects a cell included in the positioning area, where each of the one or more positioning areas includes a plurality of cells, the plurality of cells included in the positioning area use same resource configuration information, the resource configuration information is used to configure a reference signal resource, the reference signal resource is used by the terminal to send a reference signal, and the reference signal is used to determine a location of the terminal.

In a possible implementation of the second aspect, the method further includes: The network device sends second indication information, where the second indication information notifies the terminal that a priority of a first-type cell is higher than a priority of a second-type cell, in other words, the second indication information is used by the terminal to learn that the priority of the first-type cell is higher than the priority of the second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In a possible implementation of the second aspect, the second indication information indicates to the terminal that a priority of a frequency of the first-type cell is higher than a priority of a frequency of the second-type cell.

In a possible implementation of the second aspect, the second indication information indicates to the terminal that a priority of an identifier of the first-type cell is higher than a priority of an identifier of the second-type cell. In other words, the second indication information indicates that a priority of a cell corresponding to a first-type identifier is higher than a priority of a cell corresponding to a second-type identifier, where the first-type identifier includes an identifier of each cell of the first-type cell, and the second-type identifier includes an identifier of each cell of the second-type cell.

In a possible implementation of the second aspect, the second indication information carries a first adjustment value, the first adjustment value is used to perform an operation with a value of a first target parameter or a value of a second target parameter, to increase the value of the first target parameter or decrease the value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell.

In a possible implementation of the second aspect, the second indication information is carried in a system message SIB, a position system message Pos SIB, or an RRC message.

In a possible implementation of the second aspect, the method further includes: The network device sends third indication information, where the third indication information is used by the terminal to learn that an R value of a first-type cell is greater than an R value of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In a possible implementation of the second aspect, the third indication information carries a second adjustment value, the second adjustment value is used to perform an operation with a value of a third target parameter or a value of a fourth target parameter, to decrease the value of the third target parameter or increase the value of the fourth target parameter, the third target parameter is a temporary offset of the first-type cell, a reselection offset of the first-type cell, or an RSRP of the first-type cell; and the fourth target parameter is a temporary offset of the second-type cell, a reselection offset of the second-type cell, or an RSRP of the second-type cell.

In a possible implementation of the second aspect, the second adjustment value is used to enable the operation with the value of the third target parameter to satisfy a formula:

$$Rn = Qmeas,n - Qoffset - Qoffset_{temp} + Qoffsetdeta; \text{ or}$$

$$Rn = Qmeas,n - Qoffset * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell.

In a possible implementation of the second aspect, the third indication information is carried in a system message SIB, a position system message Pos SIB, or an RRC message.

According to a third aspect, a cell reselection method is provided. The method includes: A terminal receives first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by the terminal to send a reference signal, and the reference signal is used to determine a location of the terminal. The terminal receives second indication information, where the second indication information is used by the terminal to learn that a priority of a first-type cell is higher than a priority of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area. The terminal performs cell reselection in the positioning area indicated by the first indication information, and reselects the first-type cell that has the higher priority and that is indicated by the second indication information.

In a possible implementation of the third aspect, the second indication information indicates to the terminal that a priority of a frequency of the first-type cell is higher than a priority of a frequency of the second-type cell.

In a possible implementation of the third aspect, the second indication information indicates to the terminal that a priority of an identifier of the first-type cell is higher than a priority of an identifier of the second-type cell. In other words, the second indication information indicates that a priority of a cell corresponding to a first-type identifier is higher than a priority of a cell corresponding to a second-type identifier, where the first-type identifier includes an identifier of each cell of the first-type cell, and the second-type identifier includes an identifier of each cell of the second-type cell.

In a possible implementation of the third aspect, the second indication information carries a first adjustment value, the first adjustment value is used to perform an operation with a value of a first target parameter or a value of a second target parameter, to increase the value of the first target parameter or decrease the value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell.

In a possible implementation of the third aspect, the second indication information is carried in a system message SIB, a position system message Pos SIB, or an RRC message.

According to a fourth aspect, a cell reselection method is provided. The method includes: A network device sends first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by a terminal to send a reference signal, and the reference signal is used to determine a location of the terminal. The network device sends second indication information, where the second indication information is used by the terminal to learn that a priority of a first-type cell is higher than a priority of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area, so that the terminal performs cell reselection in the positioning area indicated by the first indication information, to reselect the first-type cell that has the higher priority and that is indicated by the second indication information.

In a possible implementation of the fourth aspect, the second indication information indicates to the terminal that a priority of a frequency of the first-type cell is higher than a priority of a frequency of the second-type cell.

In a possible implementation of the fourth aspect, the second indication information indicates to the terminal that a priority of an identifier of the first-type cell is higher than a priority of an identifier of the second-type cell. In other words, the second indication information indicates that a priority of a cell corresponding to a first-type identifier is higher than a priority of a cell corresponding to a second-type identifier, where the first-type identifier includes an identifier of each cell of the first-type cell, and the second-type identifier includes an identifier of each cell of the second-type cell.

In a possible implementation of the fourth aspect, the second indication information carries a first adjustment value, the first adjustment value is used to perform an operation with a value of a first target parameter or a value of a second target parameter, to increase the value of the first target parameter or decrease the value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell.

In a possible implementation of the fourth aspect, the second indication information is carried in a system message SIB, a position system message Pos SIB, or an RRC message.

According to a fifth aspect, a cell reselection method is provided. The method includes: A terminal receives first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by the terminal to send a reference signal, and the reference signal is used to determine a location of the terminal. The terminal receives second indication information, where the second indication information carries a first adjustment value, the first adjustment value is used by the terminal to increase a priority of a first-type cell, so that the priority of the first-type cell is higher than a priority of a second-type cell, the first-type cell includes a serving cell and a cell that is in neighboring cells of the serving cell and that belongs to the positioning area, and the second-type cell is a cell that is in the neighboring cells of the serving cell and that does not belong to the positioning area. The terminal performs cell reselection in the positioning area indicated by the first indication information, and reselects the first-type cell having the higher priority.

In a possible implementation of the fifth aspect, the first adjustment value is used to perform an operation with a value of a first target parameter, to increase the value of the first target parameter, the value of the first target parameter indicates the priority of the first-type cell, and the value of the first target parameter is positively correlated with the priority of the first-type cell.

In a possible implementation of the fifth aspect, the first adjustment value is used to perform an addition operation with the value of the first target parameter, to increase the value of the first target parameter.

In a possible implementation of the fifth aspect, the first adjustment value is used to perform a multiplication operation with the value of the first target parameter, to increase the value of the first target parameter.

In a possible implementation of the fifth aspect, the first adjustment value is used to replace the priority of the first-type cell, so that a priority of the first-type cell obtained through the replacement is higher than the priority of the first-type cell before the replacement.

In a possible implementation of the fifth aspect, the first adjustment value is used by the terminal to increase a priority of a frequency of the first-type cell, so that the priority of the frequency of the first-type cell is higher than a priority of a frequency of the second-type cell.

In a possible implementation of the fifth aspect, the first adjustment value is used to perform a subtraction operation with a value of a second target parameter, to decrease the value of the second target parameter.

In a possible implementation of the fifth aspect, the first adjustment value is used to perform a division operation with the value of the second target parameter, to decrease the value of the second target parameter.

In a possible implementation of the fifth aspect, the first adjustment value is used to replace the priority of the second-type cell, so that a priority of the second-type cell obtained through the replacement is lower than the priority of the second-type cell before the replacement.

In a possible implementation of the fifth aspect, the first adjustment value is used by the terminal to decrease the priority of the frequency of the second-type cell, so that the priority of the frequency of the second-type cell is lower than the priority of the frequency of the first-type cell.

According to a sixth aspect, a cell reselection method is provided. The method includes: A network device sends first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by a terminal to send a reference signal, and the reference signal is used to determine a location of the terminal. The network device sends second indication information, where the second indication information carries a first adjustment value, the first adjustment value is used by the terminal to increase a priority of a first-type cell, so that the priority of the first-type cell is higher than a priority of a second-type cell, the first-type cell includes a serving cell and a cell that is in neighboring cells of the serving cell and that belongs to the positioning area, and the second-type cell is a cell that is in the neighboring cells of the serving cell and that does not belong to the positioning area. Therefore, the terminal performs cell reselection in the positioning area indicated by the first indication information, and reselects the first-type cell having the higher priority.

In a possible implementation of the sixth aspect, the first adjustment value is used to perform an operation with a value of a first target parameter, to increase the value of the first target parameter, the value of the first target parameter indicates the priority of the first-type cell, and the value of the first target parameter is positively correlated with the priority of the first-type cell.

In a possible implementation of the sixth aspect, the first adjustment value is used to perform an addition operation with the value of the first target parameter, to increase the value of the first target parameter.

In a possible implementation of the sixth aspect, the first adjustment value is used to perform a multiplication operation with the value of the first target parameter, to increase the value of the first target parameter.

In a possible implementation of the sixth aspect, the first adjustment value is used to replace the priority of the first-type cell, so that a priority of the first-type cell obtained through the replacement is higher than the priority of the first-type cell before the replacement.

In a possible implementation of the sixth aspect, the first adjustment value is used by the terminal to increase a priority of a frequency of the first-type cell, so that the priority of the frequency of the first-type cell is higher than a priority of a frequency of the second-type cell.

In a possible implementation of the sixth aspect, the first adjustment value is used to perform a subtraction operation with a value of a second target parameter, to decrease the value of the second target parameter.

In a possible implementation of the sixth aspect, the first adjustment value is used to perform a division operation with the value of the second target parameter, to decrease the value of the second target parameter.

In a possible implementation of the sixth aspect, the first adjustment value is used to replace the priority of the second-type cell, so that a priority of the second-type cell obtained through the replacement is lower than the priority of the second-type cell before the replacement.

In a possible implementation of the sixth aspect, the first adjustment value is used by the terminal to decrease the priority of the frequency of the second-type cell, so that the priority of the frequency of the second-type cell is lower than the priority of the frequency of the first-type cell.

According to a seventh aspect, a cell reselection method is provided. The method includes: A terminal receives first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by the terminal to send a reference signal, and the reference signal is used to determine a location of the terminal. The terminal receives third indication information, where the third indication information is used by the terminal to learn that an R value of a first-type cell is greater than an R value of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area. The terminal performs cell reselection in the positioning area indicated by the first indication information, and reselects the first-type cell that has the larger R value and that is indicated by the second indication information.

In a possible implementation of the seventh aspect, the third indication information carries a second adjustment value, the second adjustment value is used to perform an operation with a value of a third target parameter to decrease the value of the third target parameter, and the third target parameter is a temporary offset of the first-type cell, a reselection offset of the first-type cell, or an RSRP of the first-type cell.

In a possible implementation of the seventh aspect, the second adjustment value is used to enable the operation with the value of the third target parameter to satisfy a formula:

$$Rn = Qmeas,n - Qoffset - Qoffset_{temp} + Qoffsetdeta.$$

In a possible implementation of the seventh aspect, the second adjustment value is used to enable the operation with the value of the third target parameter to satisfy a formula:

$$Rn = Qmeas,n - Qoffset * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell.

In a possible implementation of the seventh aspect, the third indication information carries a second adjustment value, the second adjustment value is used to perform an operation with a value of a fourth target parameter to increase the value of the fourth target parameter, and the fourth target parameter is a temporary offset of the second-type cell, a reselection offset of the second-type cell, or an RSRP of the second-type cell.

In a possible implementation of the seventh aspect, the third indication information is carried in a system message SIB, a position system message Pos SIB, or a radio resource control RRC message.

According to an eighth aspect, a cell reselection method is provided. The method includes: A network device sends first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by a terminal to send a reference signal, and the reference signal is used to determine a location of the terminal. The network device sends third indication information, where the third indication information is used by the terminal to learn that an R value of a first-type cell is greater than an R value of a second-type cell, the first-type cell includes a serving cell and a cell that is in neighboring cells of the serving cell and that belongs to the positioning area, and the second-type cell is a cell that is in the neighboring cells of the serving cell and that does not belong to the positioning area, so that the terminal performs cell reselection in the positioning area indicated by the first indication information, and reselects the first-type cell that has the larger R value and that is indicated by the third indication information.

In a possible implementation of the eighth aspect, the third indication information carries a second adjustment value, the second adjustment value is used to perform an operation with a value of a third target parameter to decrease the value of the third target parameter, and the third target parameter is a temporary offset of the first-type cell, a reselection offset of the first-type cell, or an RSRP of the first-type cell.

In a possible implementation of the eighth aspect, the second adjustment value is used to enable the operation with the value of the third target parameter to satisfy a formula:

$$Rn = Qmeas,n - Qoffset - Qoffset_{temp} + Qoffsetdeta.$$

In a possible implementation of the eighth aspect, the second adjustment value is used to enable the operation with the value of the third target parameter to satisfy a formula:

$$Rn = Qmeas,n - Qoffset * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell.

In a possible implementation of the eighth aspect, the third indication information carries a second adjustment value, the second adjustment value is used to perform an operation with a value of a fourth target parameter to increase the value of the fourth target parameter, and the fourth target parameter is a temporary offset of the second-type cell, a reselection offset of the second-type cell, or an RSRP of the second-type cell.

In a possible implementation of the eighth aspect, the third indication information is carried in a system message SIB, a position system message Pos SIB, or an RRC message.

According to a ninth aspect, a terminal is provided. The terminal has functions of implementing the cell reselection method according to the first aspect, the third aspect, the fifth aspect, or the seventh aspect. The function may be implemented by hardware, or may be implemented by hardware executing corresponding software. The hardware or the software includes one or more modules corresponding to the foregoing function.

According to a tenth aspect, an embodiment of this application provides a network device. The network device has functions of implementing the cell reselection method according to the second aspect, the fourth aspect, the sixth aspect, or the eighth aspect. The function may be implemented by hardware, or may be implemented by hardware executing corresponding software. The hardware or the software includes one or more modules corresponding to the foregoing function.

According to an eleventh aspect, this application provides a terminal. The terminal includes a processor and a memory, the memory is configured to store a computer program, and the processor is configured to execute the computer program stored in the memory, to enable the terminal to perform the method according to the first aspect, the third aspect, the fifth aspect, or the seventh aspect.

According to a twelfth aspect, this application provides a network device. The network device includes a processor and a memory, the memory is configured to store a computer program, and the processor is configured to execute the computer program stored in the memory, to enable the network device to perform the method according to the second aspect, the fourth aspect, the sixth aspect, or the eighth aspect.

According to a thirteenth aspect, a communication system is provided. The communication system includes the terminal according to the ninth aspect or the eleventh aspect, and the network device according to the tenth aspect and the twelfth aspect.

According to a fourteenth aspect, this application provides a chip system. The chip system includes a processor, configured to implement a function of the network device or the terminal in the methods according to the foregoing aspects. In a possible design, the chip system further includes a memory, configured to store program instructions and/or data. The chip system may include a chip; or may include a chip and another discrete component.

According to a fifteenth aspect, a computer program product is provided. The computer program product includes computer program code. When the computer program code is run, the method performed by the network device or the terminal in the foregoing aspects is performed.

According to a sixteenth aspect, this application provides a computer-readable storage medium. The computer-readable storage medium stores a computer program. When the computer program is run, the method performed by the network device or the terminal in the foregoing aspects is implemented.

In embodiments of this application, a network device may first configure one or more positioning areas for a terminal. Each positioning area corresponds to one reference signal resource, and each positioning area includes a plurality of cells. In other words, the plurality of cells correspond to the reference signal resource. Then, it is ensured that when performing cell reselection in the cell in the positioning area, the network device can reselect the cell in the positioning area, but does not reselect a cell outside the positioning area. In this manner, it is ensured that the terminal does not need to frequently obtain SRS configuration information after reselecting the cell, to decrease power consumption of the terminal.

DESCRIPTION OF EMBODIMENTS

Figure 1:
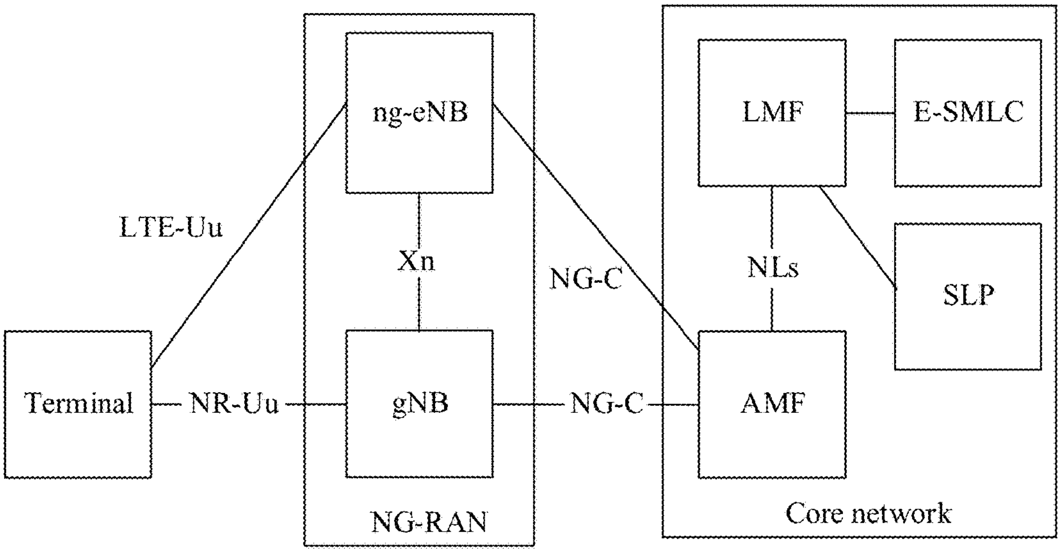
FIG. 1 is a diagram of a network architecture of a communication system to which an embodiment of this application is applicable.

To make objectives, technical solutions, and advantages of embodiments of this application clearer, the following further describes embodiments of this application in detail with reference to the accompanying drawings.

Before this application is described, some terms in embodiments of this application are first briefly explained and described, to help a person skilled in the art have a better understanding.

(1) A terminal (also referred to as user equipment (UE)) in embodiments of this application is a device having a wireless transceiver function. The terminal device may communicate with a core network through a radio access network (RAN), and exchange a voice and/or data with the RAN. The terminal device may be deployed on land, including an indoor or outdoor device, a handheld device, or a vehicle-mounted device; or may be deployed on water (for example, on a ship); or may be deployed in the air (for example, on an airplane, a balloon, or a satellite). The terminal device may be a mobile phone (mobile phone), a tablet computer (pad), a computer that has a wireless transceiver function, a virtual reality (VR) terminal, an augmented reality (AR) terminal, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), or the like. The terminal device may include, for example, UE, a wireless terminal device, a mobile terminal device, a device-to-device (D2D) communication terminal device, a vehicle-to-everything (V2X) terminal device, a machine-to-machine/machine type communication (M2M/MTC) terminal device, an internet of things (IoT) terminal device, a subscriber unit (subscriber unit), a subscriber station (subscriber station), a mobile station (mobile station), a remote station (remote station), an access point (AP), a remote terminal (remote terminal), customer premises equipment (CPE), fixed wireless access (FWA), an access terminal (access terminal), a user terminal (user terminal), a user agent (user agent), or a user device (user device). For example, the terminal device may include a mobile phone (or referred to as a "cellular" phone), a computer having a mobile terminal device, or a portable, pocket-sized, handheld, or computer built-in mobile apparatus. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

By way of example rather than limitation, in embodiments of this application, the terminal may alternatively be a wearable device. The wearable device may also be referred to as a wearable intelligent device, an intelligent wearable device, or the like, and is a generic term for wearable devices that are intelligently designed and developed by applying wearable technologies to daily wear, such as glasses, gloves, watches, clothes, and shoes. The wearable device is a portable device that can be directly worn on the body or integrated into clothes or an accessory of a user. The wearable device is not merely a hardware device, but also implements a powerful function through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminals described above are located on a vehicle (for example, placed in the vehicle or installed in the vehicle), the terminals may be considered as in-vehicle terminal devices. For example, the in-vehicle terminal devices are also referred to as on-board units (OBUs).

The terminal may establish a connection to a carrier network through an interface (for example, N1) provided by the carrier network, and use services such as a data service and/or a voice service provided by the carrier network. The terminal device may further access a DN through the carrier network, and use a carrier service deployed on the DN and/or a service provided by a third party. The third party may be a service party except the carrier network and the terminal device, and may provide a service such as data and/or a voice for the terminal device. A specific representation form of the third party may be determined based on an actual application scenario, and is not limited herein.

(2) A core network in embodiments of this application may include a network device that processes and forwards signaling and data of a user. For example, core network devices such as an AMF, a session management function (SMF), a user plane gateway, and a location management device are included. The user plane gateway may be a server that has functions such as mobility management, routing, and forwarding specific to user plane data. The user plane gateway, for example, a serving gateway (SGW), a packet data network gateway (PGW), or a user plane network element functional entity (UPF), is generally located on a network side. The AMF and the SMF are equivalent to mobility management entities (MMEs) in an LTE system. The AMF is mainly responsible for admission, and the SMF is mainly responsible for session management. Certainly, the core network may further include other network elements, which are not listed one by one herein.

The location management device has a positioning function. The location management device in embodiments of this application may include a location management function (LMF) or a location management component (LMC), or may be a local location management function (LLMF) located in a network device. This is not limited in embodiments of this application. For ease of description, the following embodiments are described by using an example in which the location management device is an LMF.

(3) A network device in embodiments of this application includes, for example, an access network (AN) device. An NG-RAN in embodiments of this application may include one or more access network devices. The access network device in the NG-RAN may also be referred to as a base station, a RAN node, or a RAN device. A network device in a V2X technology is a road side unit (RSU). The RSU may be a fixed infrastructure entity that supports a V2X application, and may exchange messages with another entity that supports the V2X application. The network device is an entity that is on a network side and that is configured to transmit and/or receive a signal, and may be configured to perform mutual conversion between a received over-the-air frame and an internet protocol (IP) packet, and serve as a router between a terminal and a rest part of an access network. The rest part of the access network may include an IP network or the like. The network device may further coordinate attribute management of an air interface. For example, the network device may be an evolved NodeB (eNB or e-NodeB) in LTE. The eNB is an apparatus that is deployed in a radio access network and that satisfies a 4G standard and provides a wireless communication function for a terminal. The access network device may alternatively be a new radio (NR) controller, a gNodeB (gNB) in a 5G system, a central unit (central unit), a new radio base station, a remote radio module, a micro base station (also referred to as a small cell), a relay (relay), a distributed unit (distributed unit), macro base stations in various forms, a transmission reception point (TRP), a transmission measurement function (TMF), a transmission point (TP), any other radio access device, or a base station in next generation communication. However, embodiments of this application are not limited thereto. The network device may alternatively include a radio network controller (RNC), a NodeB (NB), a base station controller (base station controller, BSC), a base transceiver station (BTS), a home base station (for example, a home evolved NodeB, or a home NodeB, HNB), a baseband unit (BBU), wireless fidelity (Wi-Fi), an access point AP, or the like.

In some deployments, a base station (for example, a gNB) may include a central unit (CU) and a distributed unit (DU). To be specific, functions of a base station in an original LTE access network are divided, some functions of the base station are deployed in one CU, remaining functions are deployed in DUs, and the plurality of DUs share the CU. This can decrease costs and facilitate network expansion. The CU and the DU may be split based on a protocol stack. An RRC layer, a service data adaptation protocol (SDAP) layer, and a PDCP layer are deployed in the CU, and a radio link control RLC layer, a media access control (MAC) layer, and a PHY layer are deployed on the DU. The CU and the DU may be connected through an F1 interface. The CU is connected to the core network through an NG interface on behalf of the gNB, and the CU is connected to another gNB through an Xn interface on behalf of the gNB.

Further, the CU may be further divided into a CU-control plane (CP) and a CU-user plane (UP). The CU-CP is responsible for a control plane function, and mainly includes the RRC layer and a PDCP layer corresponding to the control plane, namely, a PDCP-C layer. The PDCP-C is mainly responsible for data encryption and decryption, integrity protection, data transmission, and the like on the control plane. The CU-UP is responsible for a user plane function, and mainly includes the SDAP layer and a PDCP layer corresponding to the user plane, namely, a PDCP-U layer. The SDAP is mainly responsible for processing data of the core network and mapping a flow to a bearer. PDCP-U is responsible for data plane encryption and decryption, integrity protection, header compression, sequence number maintenance, data transmission, and the like. The CU-CP and the CU-UP are connected through an E1 interface. On behalf of the gNB, the CU-CP is connected to the core network through the NG interface, and is connected to the DU through an F1 interface-control plane, namely, F1-C. The CU-UP is connected to the DU through an F1 interface-user plane, namely, F1-U. Certainly, in another possible implementation, the PDCP-C is alternatively in the CU-UP.

(4) A user-centric positioning area (UCPA) may be a cell in which a user is currently located and one or more neighboring cells of the cell.

(5) Terms "system" and "network" may be used interchangeably in embodiments of this application. The term "a plurality of" means two or more than two. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

"At least one of the following items (pieces)" or a similar expression thereof indicates any combination of these items, including a singular item (piece) or any combination of plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are used to distinguish between a plurality of objects, but are not intended to limit a sequence, a time sequence, priorities, or importance degrees of the plurality of objects. For example, a first message and a second message are merely used to distinguish different messages, and are not used to indicate different priorities, sending sequences, or importance degrees of the two types of messages.

FIG. 1 is a schematic diagram of a positioning architecture in LTE and NR Rel-16. As shown in FIG. 1, involved network elements/modules mainly include three parts: a next generation radio access network (NG RAN), a terminal, and a core network.

The core network includes an LMF, an access and mobility management function (AMF), a service location protocol (SLP), an evolved serving mobile location center (E-SMLC), and the like. A location server, namely, the LMF, is connected to the AMF, and the LMF and the AMF are connected through an NLs interface. The LMF is responsible for supporting different types of location services related to the terminal, including positioning the terminal and transferring assistance data to the terminal. The AMF may receive a terminal-related location service request from a 5th generation core network location service (5GC LCS) entity, or the AMF may enable some location services on behalf of a specific terminal, and forward the location service request to the LMF. After obtaining location information returned by the terminal, the AMF returns the related location information to the 5GC LCS entity.

The NG RAN may include a next generation NodeB (gNB), a next generation evolved NodeB (ng-eNB), and the like. The gNB and the ng-eNB are connected through an Xn interface, and the LMF and the ng-eNB/gNB are connected through an NG-C interface.

One or more network devices on an NG RAN side configure, for the terminal, a resource used to send a reference signal, measure an uplink signal such as the reference signal from the terminal, and feed back a measurement result to the LMF to support positioning. It should be understood that the reference signal is used for positioning, and may also be referred to as a positioning reference signal. This specification mainly focuses on uplink positioning. Therefore, the positioning reference signal may be an SRS, a preamble (Preamble), or the like. In this specification, an example in which the positioning reference signal is an SRS is used. Generally, an SRS resource is configured based on a cell level, in other words, an SRS resource is configured for each cell. As the terminal moves, the terminal may move from one cell (a current cell) to another cell (for example, referred to as a target cell). In this case, the terminal performs cell handover. In a cell handover process, an SRS resource configured by a serving base station for the current cell is released. After the terminal re-establishes an RRC connection to the target cell, the terminal obtains an SRS resource configured for the target cell, to send an SRS on the SRS resource.

Due to mobility of the terminal, in a positioning process, the terminal needs to frequently obtain an SRS resource configuration. As a result, power consumption of the terminal is increased, and battery power consumption is high. This is contrary to a low power consumption requirement of the terminal.

In view of this, in the solutions provided in embodiments of this application, a same SRS resource may be configured for a plurality of cells in a specific area. If the terminal is located in the area, the terminal does not need to re-obtain an SRS resource configuration. In this way, a quantity of times that the terminal obtains the SRS resource configuration is decreased, to decrease power consumption of the terminal.

A positioning method provided in embodiments of this application may be applied to various communication systems, for example, a long term evolution (LTE) system, a 5th generation (5G) system such as NR, and a next generation communication system such as a 6G system. Certainly, the technical solutions in embodiments of this application may also be applied to another communication system, provided that the communication system has a positioning requirement for a terminal. In addition, the communication system is further applicable to a future-oriented communication technology. The systems described in embodiments of this application are intended to describe the technical solutions in embodiments of this application more clearly, and constitute no limitation on the technical solutions provided in embodiments of this application. A person of ordinary skill in the art may learn that, with evolution of network architectures, the technical solutions provided in embodiments of this application are also applicable to a similar technical problem.

Figure 2:
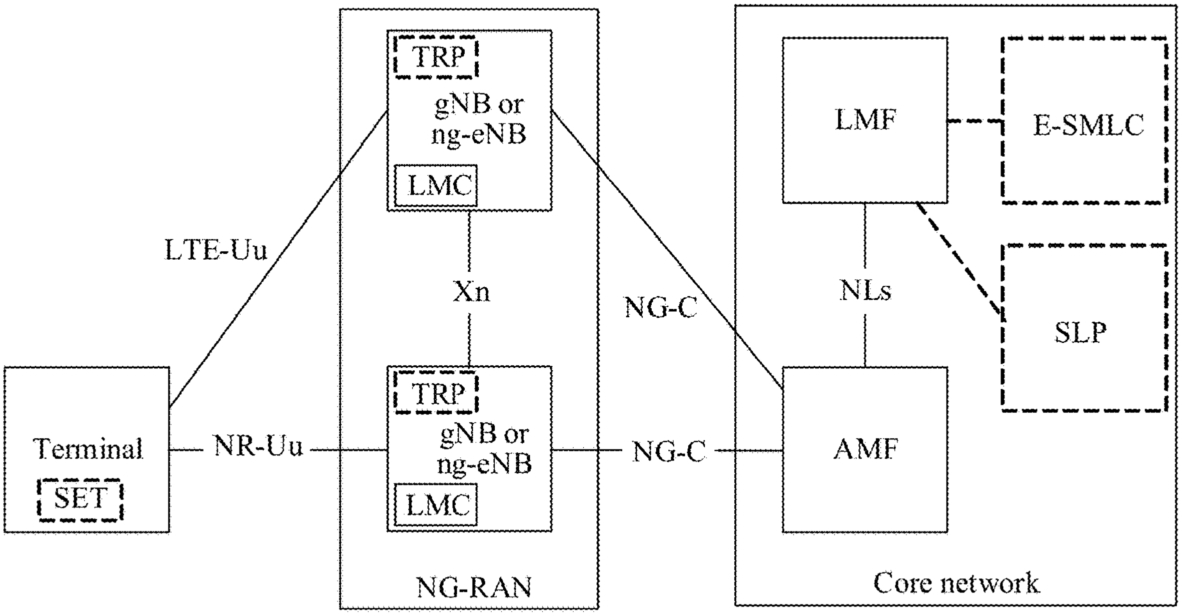
FIG. 2 is a diagram of a network architecture of another communication system to which an embodiment of this application is applicable.

FIG. 2 shows a network architecture of a communication system to which an embodiment of this application is applicable. The communication system includes a core network, an NG-RAN, and a terminal. The core network includes network elements/modules such as an LMF, an AMF, a secure user plane location (SUPL) location platform (SLP), and an enhanced serving mobile location center (E-SMLC). The NG RAN includes network elements/modules such as a gNB and an ng-eNB. For specific functions of the network elements/modules such as the LMF, the AMF, the SLP, the E-SMLC, the gNB, and the ng-eNB and connection relationships between the network elements/modules, refer to descriptions of related parts in FIG. 1 above, and details are not described herein again.

A difference from FIG. 1 lies in that, in the network architecture shown in FIG. 2, an LMC is added to the NG-RAN, and the LMC is disposed inside a base station, for example, disposed in the gNB or the ng-ENB. In this network architecture, the LMC serves as an internal function of the base station. Therefore, no new interface needs to be introduced.

Figure 3:
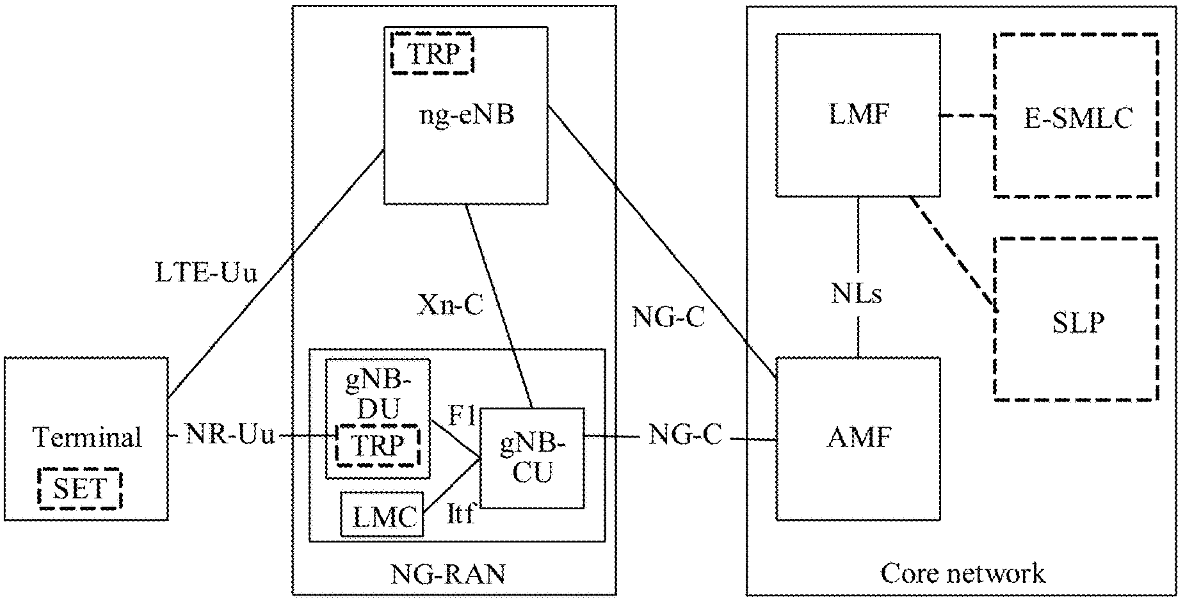
FIG. 3 is a diagram of a network architecture of another communication system to which an embodiment of this application is applicable.

FIG. 3 shows a network architecture of another communication system to which an embodiment of this application is applicable. As shown in FIG. 3, the communication system also includes a core network, an NG-RAN, and a terminal. A difference from FIG. 2 lies in that, an LMC in the network architecture shown in FIG. 3 serves as an independent logical node in the NG-RAN, and is connected to a base station through a new interface. For example, in FIG. 3, the LMC is connected to a gNB-CU through an interface Itf.

Figure 4:
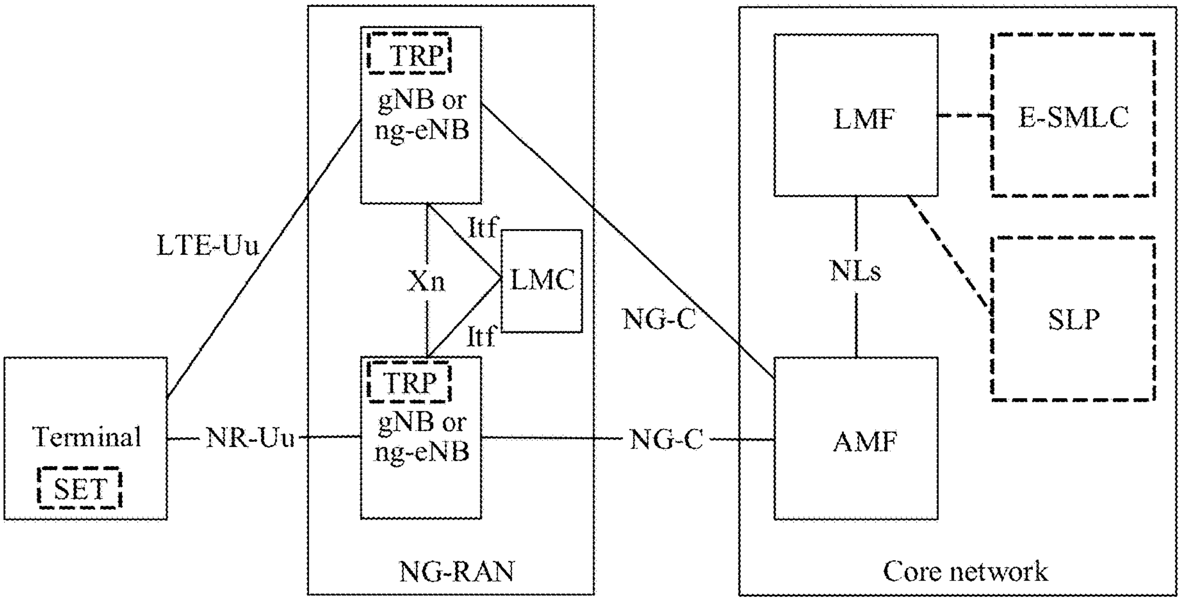
FIG. 4 is a diagram of a network architecture of another communication system to which an embodiment of this application is applicable.

FIG. 4 shows a network architecture of another communication system to which an embodiment of this application is applicable. As shown in FIG. 4, the communication system also includes a core network, an NG-RAN, and a terminal. An LMC serves as an independent logical node in the NG-RAN. A difference from FIG. 3 lies in that, the LMC may be simultaneously connected to a plurality of base stations through a new interface in FIG. 4. In FIG. 4, an example in which the LMC is simultaneously connected to two base stations is used. In a specific implementation, the LMC may alternatively be connected to more base stations.

It should be understood that FIG. 1, FIG. 2, FIG. 3, and FIG. 4 are merely examples for describing the communication systems to which embodiments of this application are applicable, and do not limit types, quantities, connection manners, and the like of network elements included in the communication systems to which this application is applicable. In addition, network elements/modules shown by dashed lines in FIG. 2 to FIG. 4 are not essential, but are optional. For example, the E-SMLC or the SLP is not essential. Alternatively, a network element/module indicated by a dashed line is in another form. For example, the gNB or the ng-eNB is also referred to as a TRP in some embodiments, and the terminal is referred to as a SET in some embodiments.

It should be understood that the positioning method includes the foregoing OTDOA positioning method, DL-AOA positioning method, DL-AOD positioning method, UL-AOA positioning method, multi-RTT positioning method, and the like. In general, the positioning method may be summarized as an uplink positioning method, a downlink positioning method, and an uplink and downlink positioning method. It should be noted that, the terms "uplink" and "downlink" herein are relative. If a transmission direction from a base station to a terminal is a downlink direction (which is used as an example in this specification), a transmission direction from the terminal to the base station is an uplink direction. On the contrary, if the transmission direction from the base station to the terminal is the uplink direction, the transmission direction from the terminal to the base station is the downlink direction.

The following describes in detail the positioning method provided in embodiments of this application with reference to the accompanying drawings.

Figure 5:
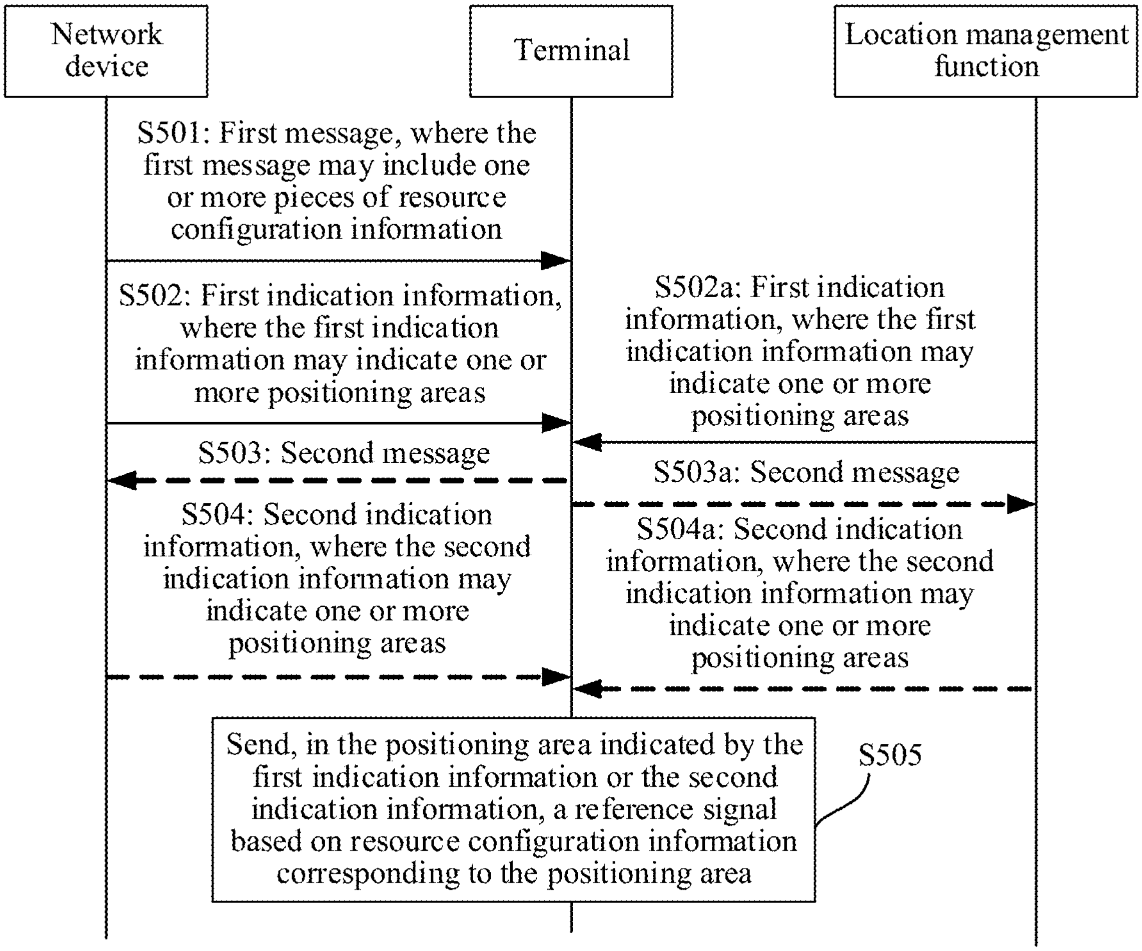
FIG. 5 is a schematic flowchart of an uplink positioning method according to an embodiment of this application.

FIG. 5 is a flowchart of an uplink positioning method according to an embodiment of this application. In the following descriptions, an example in which the method is applied to the communication systems shown in FIG. 2 to FIG. 4 is used. In addition, the method may be performed by three communication apparatuses. The three communication apparatuses are, for example, a first communication apparatus, a second communication apparatus, and a third communication apparatus. For ease of description, in the following descriptions, an example in which the method is performed by a network device, a terminal, and a location management device is used, in other words, an example in which the first communication apparatus is the network device, the second communication apparatus is the terminal, and the third communication apparatus is the location management device is used. It should be noted that the communication systems in FIG. 2 to FIG. 4 are merely used as examples in embodiments of this application. A scenario is not limited thereto. It should be understood that there is one network device (where the network device may be referred to as a serving base station) currently accessed by the terminal. For ease of description, the network device is referred to as the serving base station below. An example in which the location management device is an LMF network element is used below. It should be understood that in future communication such as 6G, the location management device may still be an LMF network element or have another name. This is not limited in embodiments of this application.

Specifically, a specific procedure of the uplink positioning method provided in embodiments of this application is described as follows:

S501: The network device sends a first message to the terminal, and correspondingly, the terminal receives the first message, where the first message may include one or more pieces of resource configuration information, each piece of resource configuration information is used to configure a reference signal resource, the reference signal resource is used by the terminal to send a reference signal, and the reference signal is used to determine a location of the terminal.

S502: The network device sends first indication information to the terminal, and correspondingly, the terminal receives the first indication information, where the first indication information indicates one or more positioning areas.

In this embodiment of this application, the network device may be a network device currently serving the terminal. The network device may be a device, for example, a gNB or an ng-eNB, in an NG RAN. Alternatively, the network device may be an LMC. As described above, if the LMC serves as an internal function of the network device, the network device is a network device in which the LMC is located. If a deployment solution of the LMC is shown in FIG. 3 or FIG. 4, to be specific, the LMC serves as an independent logical node and is connected to one or more network devices through an interface, the network device is any network device connected to the LMC.

In an existing uplink positioning procedure, the network device configures, for the terminal, a resource (also referred to as an SRS resource) used to send an SRS, and the network device notifies the terminal of the SRS resource. The terminal may send the SRS on the SRS resource for subsequent positioning. However, currently, an SRS resource is configured based on a cell level, in other words, an SRS resource is configured for each cell. As the terminal moves, the terminal may move from one cell (a current cell) to another cell (for example, referred to as a target cell). In this case, the terminal performs cell handover. In a cell handover process, an SRS resource configured by the serving base station for the current cell is released. After the terminal re-establishes an RRC connection to the target cell, the terminal obtains an SRS resource configured for the target cell, to send the SRS on the SRS resource. Due to mobility of the terminal, in a positioning process, the terminal needs to frequently obtain an SRS resource configuration. As a result, power consumption of the terminal is increased, and battery power consumption is high.

Therefore, in this embodiment of this application, the cell in which the terminal is located and a plurality of neighboring cells of the cell may be considered as one virtual cell, and one virtual cell corresponds to one SRS resource. In this way, when the terminal moves in a virtual cell, the terminal may send an SRS by using an obtained SRS resource, in other words, when the terminal is handed over between cells, the terminal does not need to re-obtain an SRS resource. The terminal re-obtains an SRS resource only when the terminal is handed over from one virtual cell to another virtual cell, to decrease SRS resource steps and decrease power consumption of the terminal. The virtual cell is a reference area for positioning in this specification, and therefore is referred to as a positioning area in this specification. That is, a plurality of cells may be considered as one positioning area in this embodiment of this application.

In this embodiment of this application, the first indication information may directly or indirectly indicate the one or more positioning areas, in other words, the network device may configure the one or more positioning areas for the terminal. The first message may include the one or more pieces of resource configuration information, and each piece of resource configuration information is used to configure the SRS resource. Each positioning area corresponds to one piece of resource configuration information, in other words, each positioning area corresponds to one SRS resource. When being handed over from one cell to another cell, the terminal may send the SRS based on the first indication information and the first message. For example, when the terminal is handed over from a first cell to a second cell, whether the terminal is handed over from one positioning area to another positioning area may be determined, to send the SRS based on an SRS resource corresponding to a positioning area in which the terminal is currently located.

It should be understood that each positioning area includes a plurality of cells. In some embodiments, the first indication information may indicate a plurality of cells included in each of the one or more positioning areas, in other words, the plurality of positioning areas are indicated by indicating the plurality of cells included in each positioning area. For example, the first indication information may carry one or more cell index lists, each cell index list corresponds to one positioning area, and one cell index included in each cell index list corresponds to one cell. For example, each cell index may be a physical cell identifier (CI), a cell global identifier (CGI), or the like. If the cell index is the PCI, when the terminal is handed over from one cell (for example, the first cell) to another cell (for example, the second cell), a PCI of the second cell may be obtained. For example, an SSB of the second cell is detected to identify the PCI of the second cell, and a specific cell index list in which the PCI is located is determined, so that a specific positioning area in which the terminal is currently located may be directly determined. In addition, the first indication information further includes one or more absolute radio frequency channel numbers (ARFCNs). Each cell index in each cell index list has a corresponding ARFCN for indicating a frequency of a cell. One cell index list may include one or more ARFCNs. One ARFCN may correspond to one or more cell indexes. Alternatively, one cell index list includes one or more cell indexes, and one cell index corresponds to one ARFCN.

In consideration of a case in which different cells may correspond to a same PCI, in this embodiment of this application, to more accurately determine the second cell in which the terminal is currently located, the cell index may be configured as a CGI. In this case, when the terminal is handed over to the second cell, a SIB of the second cell may be read to identify a CGI of the second cell, and a specific cell index list in which the CGI is located is determined, so that a specific positioning area in which the terminal is currently located is directly determined.

In some other embodiments, the first indication information indicates the one or more positioning areas. For example, the first indication information may carry one or more positioning area indexes. This is straightforward. The index may be, for example, an identity (identity, ID). In this case, a correspondence between a positioning area and a plurality of cells may be predefined. For example, a correspondence between a positioning area index and a cell index list may be predefined. For the terminal, when the terminal is handed over from the first cell to the second cell, an index, for example, the PCI or the CGI, of the second cell may be obtained, and a cell index list in which the index is located may be determined, so that a specific positioning area in which the terminal is located is determined based on the correspondence between the cell index list and the positioning area index. In this embodiment, because the first indication information carries the one or more positioning area indexes, that is, carries a small amount of information, signaling overheads can be decreased.

It should be understood that, if a positioning precision requirement is low, each positioning area includes a small quantity of cells. If a positioning precision requirement is high, each positioning area includes a large quantity of cells. In a possible scenario, for example, for a campus, in an initially defined correspondence between a positioning area index and a cell index list, each positioning area corresponds to a small quantity of cells, to be applicable to a scenario with a low positioning precision requirement, for example, positioning of a user in the campus. However, there may be a scenario with a high positioning precision requirement in the campus. For example, for an industrial operation scenario, a robot needs to be accurately positioned to determine whether the robot accurately reaches an operation console. In this case, the initially defined correspondence between the positioning area index and the cell index list may be updated, to implement precise positioning. To be specific, in some other embodiments, the first indication information may include one or more positioning area indexes and a cell index list corresponding to each of the one or more positioning areas. In this embodiment, the correspondence between each positioning area and the cell index list may not be unique, and the correspondence between each positioning area and the cell index list may be determined based on an actual positioning requirement. This is more flexible.

In some embodiments, different cell index lists include different cell indexes, in other words, different positioning areas include different cells. In some other embodiments, cell indexes included in different cell index lists are partially the same, in other words, different positioning areas may include a same cell, to ensure that the terminal can reduce power consumption to the greatest extent or improve positioning precision of the terminal. It should be understood that positioning performed when the terminal is located in the center of a coverage area of the network device is more accurate than that performed when the terminal is located at an edge of the coverage area of the network device. For example, positioning accuracy is poor when the terminal is located at the edge of the coverage area of the network device or when the terminal is located at a periphery of the coverage area of the network device. If the terminal moves to an edge of a positioning area, but a network device on which the terminal camps is exactly located in another positioning area, the terminal sends the SRS on an SRS resource corresponding to the another positioning area, to ensure positioning precision of the terminal. It should be understood that a movement area of the terminal may change based on time, and a movement area (referred to as a first area for short) in a current time period and a movement area (referred to as a second area for short) in a next time period partially overlap. It is assumed that the first area corresponds to one positioning area, and the second area corresponds to another positioning area. When the terminal moves to the second area, and the terminal is exactly in an area that is in the second area and that overlaps the first area, if the terminal switches to an SRS resource of a positioning area corresponding to the second area, unnecessary SRS resource switching and reporting can be avoided, to ensure continuity of a location service.

It should be understood that the network device may configure an SRS resource for the terminal. In this embodiment of this application, the network device may configure one SRS resource for one positioning area. In some embodiments, the first message may include one piece of resource configuration information for configuring one SRS resource. The first indication information may further include SRS resource information, for example, an SRS resource index. In this case, the terminal sends the SRS on the SRS resource. When the terminal is handed over from one positioning area to another positioning area, the terminal needs to re-obtain an SRS resource of a new cell to which the terminal is handed over, and send the SRS on the SRS resource. That is, the terminal performs a necessary step of obtaining the SRS resource of the new cell, for example, a step of interacting with the network device. Then, the terminal sends the SRS on the newly obtained SRS resource. Certainly, if the network device configures one SRS resource for the terminal, the first indication information may not carry an SRS resource index, because the terminal may learn of the SRS resource based on the first message.

In some other embodiments, the first message may include a plurality of pieces of resource configuration information for configuring SRS resources corresponding to the plurality of positioning areas. For example, the first indication information may further include a plurality of pieces of SRS resource information, for example, a plurality of SRS resource indexes. It should be understood that one SRS resource index corresponds to one positioning area or one cell index list. When the terminal is handed over from one positioning area to another positioning area, the terminal may directly send the SRS on an SRS resource corresponding to the another positioning area. In other words, there is no need to re-obtain an SRS resource of a new cell to which the terminal is handed over, that is, there is no need to perform some steps of obtaining the SRS resource of the new cell, to simplify a procedure. In this case, the terminal determines the another positioning area (a cell index list) and a corresponding SRS resource index, and may send an index (the cell index list) of the positioning area and the corresponding SRS resource index to the LMF. In this way, the LMF can learn in a timely manner that the terminal has switched the SRS resource, so that the SRS resource to which the terminal switches may be updated to the network device, to avoid unnecessary SRS resource switching and reporting, and ensure continuity of the location service.

That the terminal sends the SRS based on the first indication information and the first message is described later in this specification.

It should be noted that, an execution sequence of S501 and S502 is not limited in this embodiment of this application, and S501 may be performed before S502, or S502 may be performed before S501, or S501 and S502 are simultaneously performed.

The first indication information may be implemented in a plurality of implementations. In an implementation of the first indication information, the first indication information may be carried in a SIB. The network device sends the SIB in a broadcast manner, and the terminal may periodically read the SIB to obtain the first indication information. It should be understood that this implementation is compatible with a procedure in which an existing network device sends a SIB, and no additional session needs to be established. In addition, the terminal in an RRC_Inactive state may receive the SIB, that is, the terminal in the RRC_Inactive state can also obtain the first indication information. Certainly, the first indication information may be carried in an existing field of the SIB or a newly defined field. This is not limited in this embodiment of this application.

In another implementation of the first indication information, the first indication information may be carried in a Pos SIB. Similarly, the network device sends the Pos SIB in a broadcast manner, and the terminal may periodically read the Pos SIB to obtain the first indication information. It should be understood that this manner is compatible with a procedure in which an existing network device sends a Pos SIB, and no additional session needs to be established. In addition, the terminal in an RRC_Inactive state may also receive the Pos SIB, in other words, the terminal in the RRC_Inactive state can also obtain the first indication information. Certainly, the first indication information may be carried in an existing field or a newly defined field of the Pos SIB. This is not limited in embodiments of this application.

In still another implementation of the first indication information, the first indication information may be carried in an RRC message. In this manner, when having a positioning requirement, the terminal may request the network device to configure one or more positioning areas for the terminal, and the network device may configure the positioning area for the terminal based on the request of the terminal. The RRC message may also be considered as a response message sent for the request of the terminal. The terminal may receive the response message, that is, does not need to periodically read information such as a SIB. This decreases power consumption of the terminal.

It should be noted that in S502, an example in which the network device sends the first indication information to the terminal is used. In a possible implementation, the first indication information may alternatively be sent by the LMF to the terminal. That is, the LMF may perform S502*a* in FIG. 5. If the first indication information is sent by the LMF to the terminal, the first indication information may be carried in LPP signaling.

Similarly, the first message may be carried in the SIB, the Pos SIB, the RRC message, or the LPP signaling. This is not limited in this embodiment of this application.

As described above, the network device sends the first indication information to the terminal in the broadcast manner. For each terminal, positioning areas configured by the network device for terminals are the same. However, in consideration of an actual situation, for example, different requirements such as positioning precision requirements of the terminals or power consumption of the terminals, the network device may configure a dedicated positioning area for each terminal. For example, a first terminal and a second terminal exist. The network device may configure one or more positioning areas for the first terminal, but the one or more positioning areas belong to the first terminal instead of the second terminal.

It should be understood that if there are a plurality of terminals, and no terminal having a special requirement exists in the plurality of terminals, the network device may configure a same positioning area for the plurality of terminals. If a terminal having a special requirement exists in the plurality of terminals, the network device may configure a dedicated positioning area for the terminal, and configure a same positioning area for a plurality of other terminals. Before the network device configures the dedicated positioning area for the terminal, the terminal may notify the network device of some information about the terminal, for reference when the network device configures the positioning area for the terminal.

S503: The terminal sends a second message to the network device, and correspondingly, the network device receives the second message.

The second message may include one or more pieces of characteristic information of the terminal. For example, the second message may include one or more of the following: a positioning precision requirement of the terminal, battery capacity information of the terminal, and energy saving requirement information of the terminal, or other possible information. This is not limited in embodiments of this application. In some embodiments, the positioning precision requirement of the terminal may be represented by a precision level, for example, a meter level, a decimeter level, or a centimeter level. The battery capacity information of the terminal may be represented by a battery capacity percentage of the terminal, for example, 60%. If the battery capacity percentage of the terminal is small, a battery margin is small. The energy saving requirement information of the terminal may be quantified and represented by a numerical value. For example, a percentage is used for representation. 100% indicates a highest energy saving requirement, and 0% indicates a lowest energy saving requirement; and vice versa. For another example, a numerical value is used for representation. 1 indicates a highest energy saving requirement, and 0 indicates a lowest energy saving requirement; and vice versa. Certainly, these are merely examples, and a specific manner in which the energy saving requirement of the terminal is presented is not limited in embodiments of this application.

In some embodiments, the second message may be an RRC message, to be specific, the terminal notifies the network device of the positioning precision requirement of the terminal, the battery capacity information of the terminal, the energy saving requirement information of the terminal, and the like by using RRC signaling.

S504: The network device sends second indication information to the terminal, and correspondingly, the terminal receives the second indication information.

After receiving the second message from the terminal, the network device may determine the second indication information based on the second message sent by the terminal, to be specific, configure a dedicated positioning area for the terminal based on the second message. Similar to the second message, the second indication information may be carried in an RRC message, or may also be referred to as an RRC message. The second message may also be considered as a message for requesting a positioning area from the network device, and may be referred to as a positioning area request message. Correspondingly, the second indication information may be considered as a response message of the second message, that is, a positioning area response message. Certainly, when the second message is the positioning area request message, the network device may alternatively send a failure response message of the positioning area request message to the terminal, to indicate that the network device configures no dedicated positioning area for the terminal.

To be specific, similar to the first indication information, the second indication information may indicate one or more positioning areas. For example, the second indication information may include one or more positioning area indexes. Alternatively, the second indication information may indicate a plurality of cells included in each positioning area. For example, the second indication information may include one or more cell index lists. Alternatively, the second indication information may include one or more positioning area indexes and a cell index list corresponding to each positioning area. A specific implementation of the second indication information is the same as that of the first indication information. For details, refer to the specific implementation of the first indication information. Details are not described herein again.

A difference from the first indication information lies in that, because the second indication information is used to configure the dedicated positioning area for the terminal, it may be considered that a priority of the second indication information is higher than that of the first indication information. For a terminal, if the terminal receives the first indication information and the second indication information, the terminal may consider that the second indication information is valid, and the first indication information is invalid, that is, ignore the first indication information, and send, in the positioning area indicated by the second indication information, the SRS based on resource configuration information corresponding to the positioning area.

It should be noted that a system may consider by default that the priority of the second indication information is higher than the priority of the first indication information. However, in some scenarios, although the terminal receives the first indication information and the second indication information from the network device, the terminal may ignore the second indication information, and send the SRS based on the first indication information. For example, the network device further notifies the terminal that the second indication information is invalid.

In S503, an example in which the terminal sends the second message to the network device, and the network device configures the dedicated positioning area for the terminal by using the second indication information is used. In some embodiments, the LMF may alternatively configure a dedicated positioning area for the terminal. In this case, the terminal may send the second message to the LMF, that is, the terminal performs S503*a* in FIG. 5. It should be understood that the second message may be an LPP message. The LMF may perform S504*a*, that is, the LMF may send the second indication information to the terminal, where the second indication information may be carried in the LPP message.

It should be noted that S503, S504, S503*a*, and S504*a* are not mandatory steps, and therefore are illustrated by dashed lines in FIG. 5. S503 may be performed before S501 or S502. This is not limited in this embodiment of this application. In a possible implementation, if S503 is performed before S502, the network device may alternatively determine the first indication information based on the second message. Certainly, S504 may be performed before S501 or S502. Similarly, S503*a* and S504*a* may be performed before S502*a*, or may be performed after S502*a*.

S505: The terminal sends, in the positioning area indicated by the first indication information or the second indication information, the SRS based on an SRS resource corresponding to the positioning area.

If the terminal receives the first indication information, the terminal may send the SRS based on the first indication information and the first message. If the terminal receives the first indication information and the second indication information, the terminal may send the SRS based on the second indication information and the first message. The following separately describes how the terminal sends the SRS based on the first indication information or the second indication information.

The terminal reads the first message, and may determine one or more SRS resources configured by the network device for the terminal. The terminal periodically reads the SIB or the Pos SIB to obtain the first indication information, and may determine the one or more positioning areas configured by the network device for the terminal. Further, the terminal may determine the first indication information to determine the SRS resource configured by the network device for each positioning area, to send the SRS on the SRS resource. It should be understood that, due to mobility of the terminal, the terminal moves from one cell to another cell. This may cause the terminal to move from one positioning area to another positioning area. In this embodiment of this application, only when the terminal moves from one positioning area to another positioning area, the terminal re-determines an SRS resource corresponding to the another positioning area, and sends the SRS on the SRS resource. Compared with a solution in which when the terminal moves from one cell to another cell, an SRS resource for the another cell needs to be re-obtained, this solution can simplify a positioning procedure and decrease power consumption of the terminal.

For example, the first indication information indicates the one or more positioning areas. For example, the first indication information includes the one or more positioning area indexes. The terminal receives the first indication information, and may determine, for example, the one or more positioning areas configured by the network device for the terminal. If the terminal is currently located in a first positioning area, after the terminal is handed over from a cell in which the terminal is currently located, for example, the first cell, to the second cell, the terminal may detect the SSB of the second cell, identify the PCI of the second cell, and determine, based on the PCI of the second cell, whether the second cell is in the first positioning area. If the PCI of the second cell is in a cell index list corresponding to the first positioning area, the second cell is in the first positioning area. Then, the terminal may send the SRS by still using an obtained SRS resource, that is, an SRS resource corresponding to the first positioning area. If the PCI of the second cell is not in a cell index list corresponding to the first positioning area, that is, the second cell is not in the first positioning area, for example, the second cell is in a second positioning area, the terminal may release a currently obtained SRS resource, and obtain second resource configuration information corresponding to the second positioning area. That is, the terminal obtains a new SRS resource in the second cell, as an SRS resource corresponding to the second positioning area, and sends the SRS on the SRS resource.

In an alternative implementation, the terminal is handed over from the first cell to the second cell, and the terminal may read the SIB of the second cell to identify the CGI of the second cell. If the CGI of the second cell is in a cell index list corresponding to a first positioning area, the second cell is in the first positioning area, and the terminal sends the SRS by still using an obtained SRS resource, that is, an SRS resource of the second cell does not need to be re-obtained. This simplifies a positioning procedure and decreases power consumption of the terminal. If the CGI of the second cell is in a cell index list corresponding to a second positioning area, that is, the second cell is in the second positioning area, the terminal may release a currently obtained SRS resource, and obtain a new SRS resource in the second cell as an SRS resource corresponding to the second positioning area, and send the SRS on the SRS resource.

It should be understood that, an example in which the first indication information includes the one or more positioning area indexes is used. If the first indication information includes the one or more cell index lists, when the terminal moves from the first cell to the second cell, a cell index, for example, the PCI or the CGI, of the second cell is obtained, and whether the cell index of the second cell is in a first cell index list that includes a cell index of the first cell may be determined. If the cell index of the second cell is in the first cell index list, the terminal sends the SRS based on first resource configuration information corresponding to the first cell index list, that is, the terminal sends the SRS by still using the obtained SRS resource. If the cell index of the second cell is in a second cell index list, the terminal releases the currently obtained SRS resource, obtains second resource configuration information corresponding to the second cell index list, and sends the SRS based on the second resource configuration information. That is, the terminal obtains a new SRS resource in the second cell, as an SRS resource corresponding to the second positioning area, and sends the SRS on the SRS resource.

It should be noted that, if the first indication information further includes the plurality of pieces of SRS resource configuration information, that is, the network device configures the corresponding SRS resource for each positioning area, the terminal determines that the second cell is in the second positioning area, and the terminal may send the SRS on the SRS resource corresponding to the second positioning area. That is, the terminal does not need to re-obtain an SRS resource in the second cell. This can further simplify a positioning procedure and decrease power consumption of the terminal.

For example, if the terminal is handed over from the first cell to the second cell, and the terminal determines that the cell index of the second cell is, for example, in a third cell index list, the terminal may determine an SRS resource index corresponding to the third cell index list, and send the SRS on an SRS resource corresponding to the SRS resource index. Similarly, if the terminal determines that the second cell is in, for example, a third positioning area, the terminal determines an SRS resource index corresponding to the third positioning area, and sends the SRS on an SRS resource corresponding to the SRS resource index.

It should be understood that if the terminal further receives the second indication information, the terminal sends, in the positioning area indicated by the second indication information, the SRS based on the resource configuration information corresponding to the positioning area. A procedure in which the terminal sends the SRS based on the second indication information is the same as that in which the terminal sends the SRS based on the first indication information. For details, refer to the foregoing procedure in which the terminal sends the SRS based on the first indication information. Details are not described herein again.

Further, when the terminal is handed over from one positioning area (for example, the first positioning area) to another positioning area (for example, the second positioning area), the terminal may send a second positioning area index and/or an SRS resource index corresponding to the second positioning area to the LMF or the network device. In this way, the LMF or the network device can learn in a timely manner that the terminal has switched the SRS resource, to update the SRS resource in a timely manner. This avoids unnecessary SRS resource switching and reporting, to ensure continuity of the location service. In addition, for the terminal in the RRC inactive state, the terminal may notify, by using RRC signaling, the network device on which the terminal camps of the updated second positioning area of the terminal and the corresponding SRS resource. This helps the LMF or the network device learn that the SRS resource of the first positioning area has been released, so that the SRS resource of the first positioning area may be allocated to another terminal, to improve resource utilization.

The terminal notifies the network device or the LMF of the updated positioning area of the terminal and the corresponding SRS resource, and the network device or the LMF updates the positioning area of the terminal and the corresponding SRS resource. This may include the following steps.

(1) The terminal may send positioning area update information to the network device or the LMF by using an RRC connection resume request (RRC resume request) message, an RRC reconfiguration (RRC reconfiguration) message, or an RRC message. The positioning area update information may indicate the updated positioning area of the terminal and the corresponding SRS resource. It is assumed that the updated positioning area of the terminal is the second positioning area corresponding to the second cell index list. The positioning area update information may include one or more of the following information: the second positioning area index, the second cell index list, and the SRS resource index corresponding to the second positioning area (or the second cell index list).

(2) The network device may request context data of the terminal from a network device that finally serves the terminal (which is referred to as a last network device for short).

(3) The last network device (last serving gNB) feeds back the context data of the terminal to the network device.

(4) The network device requests an AMF to switch a service channel.

(5) The AMF returns a service channel switching response to the network device.

(6) The network device triggers the last network device to release a context of the terminal.

(7) The network device sends positioning area update information of the terminal to the LMF.

It should be understood that the positioning area update information needs to indicate a terminal to which the positioning area update information belongs. Therefore, the positioning area update information includes one or more of the second positioning area index, the second cell index list, and the SRS resource index corresponding to the second positioning area (or the second cell index list) in step (1), and the positioning area update information further includes information indicating the terminal and/or a current measurement task, so that the LMF learns whether the current measurement task is changed. For example, the positioning area update information may further include an identifier (index) of the terminal and/or a measurement identifier (index) indicating the measurement task, where the measurement identifier may alternatively be an NRPPa message index.

After receiving the positioning area update message, the LMF may determine that the SRS resource that is of the first positioning area and that is previously allocated to the terminal is released, and may indicate the network device to allocate the SRS resource to another terminal, to improve resource utilization.

Figure 6:
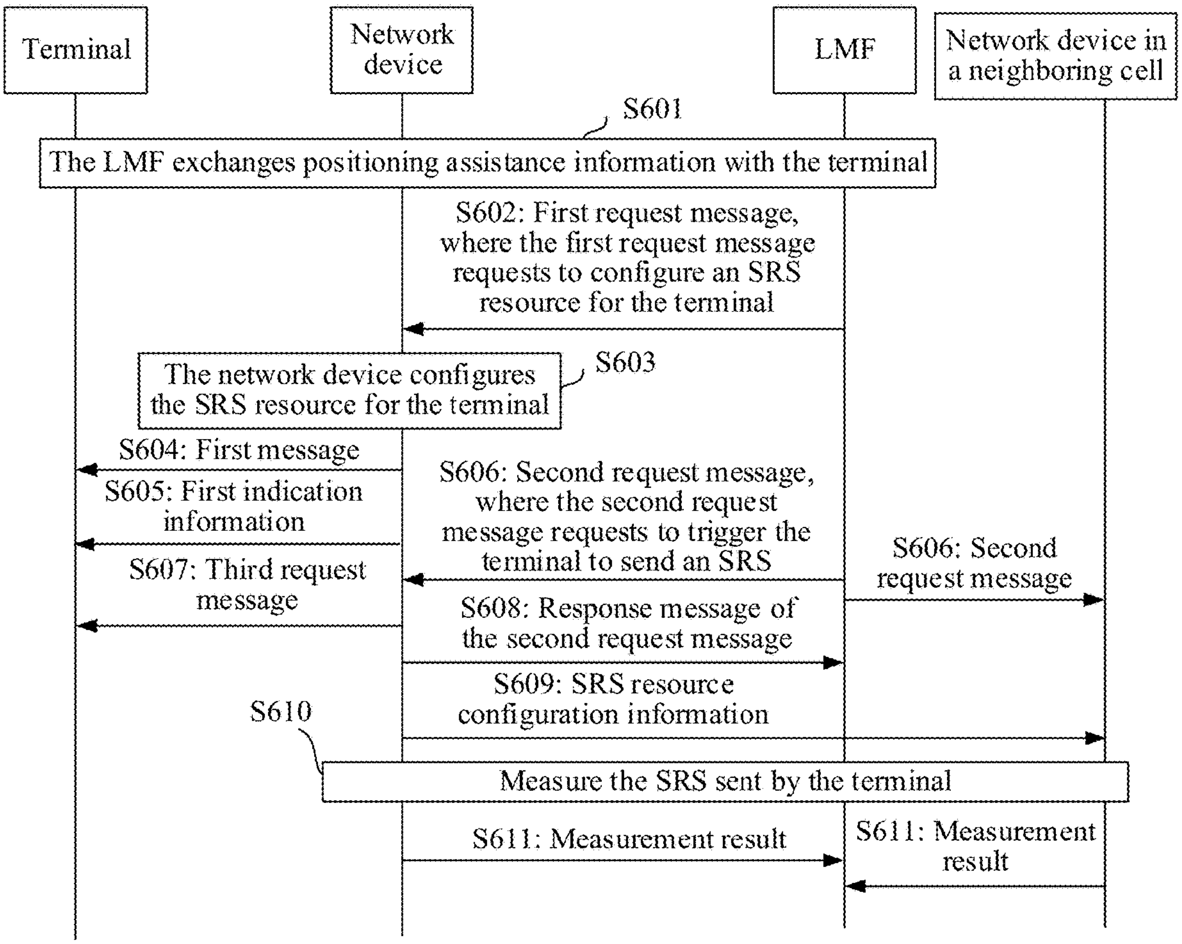
FIG. 6 is an example schematic flowchart of an uplink positioning method according to an embodiment of this application.

FIG. 6 is an example flowchart of an uplink positioning method according to an embodiment of this application. In FIG. 6, TDOA based positioning is used as an example. A positioning procedure is described as follows:

S601: A terminal exchanges positioning assistance information with an LMF.

A procedure in which the LMF exchanges the positioning assistance information with the terminal is similar to a procedure in which the terminal exchanges information with the LMF by using LPP information in an OTDOA based positioning procedure. To be specific, the terminal requests the positioning assistance information from the LMF, the LMF sends the assistance information and the like to the terminal by using LPP provide assistance data (provide assistance data). Details are not described herein again. The positioning assistance information may include an index of a cell that needs to be measured by the terminal, for example, a cell index of a neighboring cell and/or a cell index of a reference cell, and may further include an SRS configuration and the like.

The procedure in which the terminal exchanges the positioning assistance information with the LMF may further include: The LMF obtains a positioning capability of the terminal. For example, the LMF requests the positioning capability from the terminal, the LMF requests the positioning capability of the terminal through an LPP request capability (request capability) process, or the terminal reports positioning capability information to the LMF by using an LPP provide capability (provide capability). The positioning capability information may include a positioning method supported by the terminal, a measurement capability corresponding to the positioning method supported by the terminal, and the like. Alternatively, the positioning capability information may include one or more pieces of information included in the foregoing second message. To be specific, the foregoing second message may be a response message of a positioning capability request message sent by the LMF to the terminal.

S602: The LMF sends a first request message to a network device, where the first request message requests to configure an SRS resource for the terminal.

When the LMF needs to position the terminal, the LMF may request the network device (a serving base station) to configure the SRS resource for the terminal. SRS configurations of different cells may be different. In some embodiments, the LMF may notify the terminal of an SRS configuration of each cell.

S603: The network device configures the SRS resource for the terminal.

After receiving the request of the LMF, the network device may determine an available SRS resource, and configure the SRS resource for the terminal. In this embodiment of this application, the network device may configure one SRS resource for the terminal for each of a plurality of positioning areas. In comparison with a solution in which one SRS resource is configured for each cell, this solution can simplify a positioning procedure and decrease power consumption of the terminal.

It should be understood that the network device configures the SRS resource for the terminal at a positioning area granularity. In this case, after receiving the first request message, the network device may configure one or more positioning areas for the terminal, and configure one SRS resource for each positioning area. Then, the network device may notify the terminal or the LMF of the SRS resource configured for the terminal.

S604: The network device sends a first message to the terminal.

After configuring the SRS resource for the terminal, the network device may notify the terminal. For example, the network device may send the first message to the terminal. The first message may include one or more pieces of resource configuration information, and each piece of resource configuration information indicates one SRS resource.

In some embodiments, the network device may alternatively send the first message to the LMF, to notify the LMF of the SRS resource configured by the network device for the terminal.

S605: The network device sends first indication information to the terminal.

After configuring the SRS resource for the terminal, the network device may notify the terminal. For example, the network device may send the first indication information to the terminal, where the first indication information may indicate one or more positioning areas. In some embodiments, the network device notifies the LMF of the SRS resource configured by the network device for the terminal. The LMF may alternatively send the first indication information to the terminal. That is, the LMF may configure one or more positioning areas for the terminal.

For the terminal, when the terminal camps on a cell, the terminal may determine an SRS resource of the cell on which the terminal camps, that is, an SRS resource of a positioning area in which the terminal is currently located. When the terminal is handed over from the positioning area in which the terminal is currently located to another positioning area, the terminal may obtain an SRS resource in a new cell to which the terminal is handed over, as an SRS resource for the another positioning area.

In some embodiments, the first indication information may further include one or more SRS resource indexes, and one SRS resource index corresponds to one positioning area, and indicates an SRS resource corresponding to the positioning area. In this case, when the terminal is handed over from one positioning area to another positioning area, the terminal does not need to obtain an SRS resource in a new cell.

It should be understood that the first indication information may be determined based on characteristic information of the terminal, that is, determined based on the foregoing second message. In this case, the terminal may send the second message to the network device.

Certainly, the network device may alternatively configure a dedicated positioning area for the terminal based on the second message, that is, the network device may further send second indication information to the terminal. For specific implementations of the first indication information and the second indication information, refer to the descriptions in the foregoing embodiment. Details are not described herein again.

S606: The LMF sends a second request message to the network device, where the second request message requests the network device to trigger the terminal to send an SRS.

S607: The network device sends a third request message to the terminal, where the third request message triggers the terminal to send the SRS.

After determining the SRS resource configured by the network device for the terminal, the LMF may request the network device to trigger the terminal to send the SRS.

S608: The network device sends a response message of the second request message to the LMF.

S609: The network device sends SRS resource configuration information to each network device participating in positioning.

It should be understood that the SRS resource configuration information may further include all information for implementing uplink positioning measurement.

S610: Each network device measures the SRS sent by the terminal, to obtain a measurement result.

S611: Each network device sends the obtained measurement result to the LMF, so that the LMF determines a location of the terminal.

It should be noted that, FIG. 6 uses uplink TDOA based positioning as an example, and does not show all steps, for example, a step in which the terminal reports the second message to the network device and a step in which the network device sends the second indication information to the terminal. In this embodiment of this application, a plurality of cells may be considered as one positioning area, and one SRS resource is configured for one positioning area, in other words, a plurality of cells correspond to one SRS resource. In a positioning process, only when the terminal moves from one positioning area to another positioning area, the terminal needs to re-obtain a corresponding reference signal resource to send the SRS. In comparison with the solution in which one cell corresponds to one reference signal resource, in other words, an SRS resource needs to be re-obtained after handover from one cell to another cell, in this solution, the terminal does not need to frequently obtain SRS configuration information. This can decrease power consumption of the terminal.

The solutions provided in embodiments of this application are particularly applicable to a terminal that moves in a fixed area for long duration. For this type of terminal, power consumption of the terminal can be greatly decreased. An applicable scenario may include an industrial operation scenario. For example, in a factory, a current location of each device in the factory needs to be obtained, to better master location information of each device. For another example, at a dock, a current location of each transport device needs to be obtained, to better determine whether each transport device accurately arrives at a destination. An applicable scenario may further include a campus scenario. For example, a user in a campus often carries out activities in the campus for long duration. The solutions provided in embodiments of this application may be used to complete positioning of the user in the campus. It should be noted that the several applicable scenarios listed herein are merely typical scenarios to which embodiments of this application are applicable, and not all possible scenarios are listed. The solutions provided in embodiments of this application are certainly applicable to other scenarios.

In addition, based on the foregoing solution, the conventional technology has the following disadvantages: A terminal in an inactive state performs RRM measurement on a neighboring cell, and selects a cell having a high RSRP according to a particular rule, to ensure communication quality of the terminal. This process is referred to as a cell reselection process. In the cell reselection process, after the terminal reselects a target cell, the terminal re-establishes an RRC connection to the target cell, and the terminal obtains an SRS resource configured for the target cell, to send an SRS on the SRS resource. Based on a common cell reselection procedure, when a terminal moves to an edge of a positioning area, the terminal may reselect a cell outside the positioning area. In some scenarios, if the terminal reselects a cell outside the positioning area, the terminal further needs to re-obtain an SRS resource. This is not conducive to decreasing power consumption of the terminal. Alternatively, in some other scenarios, the terminal may frequently perform reselection between a cell within the positioning area and a cell outside the positioning area. As a result, the terminal needs to frequently obtain SRS configuration information. This is not conducive to decreasing power consumption of the terminal.

To resolve the foregoing problem, in embodiments of this application, a common cell reselection procedure is modified, so that after performing a cell reselection procedure, a terminal that moves to an edge of a positioning area can reselect a cell included in the positioning area. To better understand the solutions provided in embodiments of this application, the following describes the common cell reselection procedure.

Generally, network frequency band ranges allocated to different carriers are different. For example, a frequency band range obtained by a carrier A is from a frequency 1 to a frequency 2, and a frequency band range obtained by a carrier B is from a frequency 3 to a frequency 4. For different carriers, the carrier may allocate a frequency to a cell of the carrier in a frequency band range of the carrier, so that a terminal device accessing the corresponding cell works at the corresponding frequency. For example, the carrier A may set a frequency of a first cell to a frequency A in the range from the frequency 1 to the frequency 2. In this case, an operating frequency of a terminal device accessing the first cell is the frequency A. For another example, the carrier B may set a frequency of a second cell to a frequency B in the range from the frequency 3 to the frequency 4. In this case, an operating frequency of a terminal device accessing the second cell is the frequency B. Certainly, network frequency band ranges of different carriers may alternatively overlap. This is not limited in embodiments of this application.

In addition, different communication systems use different frequency band ranges. For example, a frequency band range used for a 4G communication system (also referred to as a 4G network) is a frequency band range 1, a frequency band range used for a 5G communication system (also referred to as a 5G network) is a frequency band range 2, and the frequency band range 2 is different from the frequency band range 1. In the frequency band range 1, each carrier has a corresponding frequency band range. In the frequency band range 2, each carrier also has a corresponding frequency band range. In this case, a terminal device may determine, based on a frequency of each cell, whether a corresponding cell is covered by the 4G network or the 5G network.

For neighboring cells at different frequencies, a terminal uses different manners to determine whether the neighboring cell satisfies a camping condition. The manners are separately described below.

I. Inter-Frequency Cells Having Different Priorities and Inter-Radio Access Technology (Radio Access Technology, RAT) Cells 1. If a neighboring cell has a higher priority than a serving cell or the two cells are inter-RAT cells, the terminal reselects a higher-priority cell if the following conditions are satisfied:

Condition 1: Within Treselection duration, the high-priority neighboring cell satisfies Squal>ThreshX, HighQ; or Srxlev>ThreshX, HighP, where ThreshX, HighQ is a camping threshold, and ThreshX, HighP is another camping threshold.

Condition 2: The terminal has camped on a new cell for more than 1 second.

2. If a neighboring cell has a lower priority than a serving cell or the two cells are inter-RAT cells, the terminal reselects a higher-priority cell if any one of the following conditions is satisfied:

Condition 1: Within Treselection duration, Squal<$Thresh_{serving}$, LowQ; or Squal>ThreshX, LowQ, where $Thresh_{serving}$, LowQ is a signal threshold, and ThreshX, LowQ is another signal threshold.

Condition 2: Within Treselection duration, Srxlev<$Thresh_{serving}$, LowP; or Srxlev>ThreshX, LowQ, where $Thresh_{serving}$, LowP is a signal threshold, ThreshX, LowQ is another signal threshold, and the terminal has camped on a new cell for more than 1 second.

It should be noted that, due to evolution of a communication protocol version, a manner of reselecting a higher-priority cell may change due to some reasons. Formulas provided herein are merely examples.

II. Inter-Frequency Cells Having a Same Priority and Intra-Frequency Cells

For cells at a same frequency and cells at different frequencies but having a same priority in candidate cells, cell reselection can be performed according to the S criterion and the R criterion. Specifically, the terminal first preliminarily sifting a neighboring cell based on the S criterion. The S criterion may be understood with reference to the following formula 1-1 and formula 1-2. During the preliminary sifting according to the S criterion, a neighboring cell whose Srxlev is greater than 0 and Squal is greater than 0 is sifted out.

$$Srxlev = Q_{rxlevmeas} - (Q_{rxlevmin} + Q_{rxlevminoffset}) - P_{compensation} - Qoffset_{temp}\text{; and} \quad (1\text{-}1)$$

$$Squal = Q_{qualmeas} - (Q_{qualmin} = Q_{qualminoffset}) - Qoffset_{temp}, \quad (1\text{-}2)$$

where Srxlev represents a cell selection receive level value obtained through calculation. $Q_{rxlevmeas}$ represents a received signal strength value obtained by the terminal device through measurement, and the value is a measured reference signal received power RSRP. $Q_{rxlevmin}$ represents a minimum received signal strength value required for the cell. $Q_{rxlevminoffset}$: This parameter is valid only when the terminal device normally camps on a virtual private mobile network (virtual private mobile network, VPMN) and periodically searches for a high-priority public land mobile network (public land mobile network, PLMN) for cell selection evaluation. This parameter is used to offset $Q_{rxlevmin}$. Pcompensation represents a larger value in (PEMAX-PUMAX) or 0, PEMAX is a maximum allowed transmit power specified in a system when the terminal device accesses the cell, and PUMAX is a maximum output power specified based on a level of the terminal device. $Qoffset_{temp}$ represents a temporary offset of the cell. Squal represents a cell selection quality value. $Q_{qualmeas}$ represents a measured reference signal received quality (reference signal received quality, RSRQ) value. $Q_{qualmin}$ represents a minimum quality level required for the cell, and $Q_{qualminoffset}$ represents an offset of $Q_{qualmin}$.

It should be noted that, due to evolution of a communication protocol version, the formulas of the S criterion and the formulas for calculating Srxlev and Squal may change due to some reasons. The formulas provided herein are merely examples.

Then, whether neighboring cells that satisfy the S criterion satisfy the R criterion is determined, to obtain a final cell to be reselected. The R criterion may be understood with reference to the following formula 1-3 and formula 1-4:

$$Rs = Qmeas,s + Qhyst - Qoffset_{temp}, \text{ and} \tag{1-3}$$

$$Rn = Qmeas,n - Qoffset - Qoffset_{temp}, \tag{1-4}$$

where Rs is a ranking value of a serving cell, Rn is an R value of a neighboring cell of the serving cell, and is referred to as an R value for short; Qmeas,s is a received signal strength value (dBm) measured in the serving cell, namely, an RSRP measurement value in a cell reselection process; and Qmeas,n is a received signal strength value (dBm) measured in the neighboring cell. Qoffset is a cell reselection offset. Qhyst is a hysteresis of the serving cell.

The terminal device sorts all cells that satisfy the S criterion by R values, and reselects a cell having a maximum R value (Rn). In addition, the cell having the maximum R value is greater than the Rs value of the serving cell, or the terminal has camped on a new cell for more than Is.

It should be noted that, due to evolution of a communication protocol version, the formulas of the R criterion and the formulas for calculating Rs and Rn may change due to some reasons. The formulas provided herein are merely examples.

To better understand the following embodiments, the following describes a research idea of embodiments of this application.

In the foregoing descriptions, for neighboring cells at different frequencies, a terminal determines, in different manners, whether the neighboring cell satisfies a camping condition. Therefore, in the solutions provided in embodiments of this application, different solutions are designed for neighboring cells at different frequencies, to ensure that the terminal performs cell reselection in a positioning area, and can reselect a cell included in the positioning area.

For the foregoing scenario of inter-frequency cells having different priorities and inter-RAT cells, in the solutions provided in embodiments of this application, priorities of cells included in a positioning area are adjusted, to improve the priorities of the cells included in the positioning area. Specifically, a priority of a serving cell and a priority of a cell that is in neighboring cells of the serving cell and that is included in the positioning area are adjusted, to ensure that the terminal performs cell reselection in the positioning area, and can reselect a higher-priority cell that is included in the positioning area. For the foregoing scenario of inter-frequency cells having a same priority and intra-frequency cells in the solutions provided in embodiments of this application, the R criterion is modified, to increase an R value of a serving cell and an R value of a cell that is in neighboring cells of the serving cell and that is included in a positioning area, to ensure that a terminal performs cell reselection in the positioning area, and can reselect a cell that has a larger R value and that is included in the positioning area.

Based on this research idea, the following describes the solutions provided in embodiments of this application for a scenario of inter-frequency cells having different priorities and inter-RAT cells, and a scenario of inter-frequency cells having a same priority and intra-frequency cells.

I. Scenario of Inter-Frequency Cells Having Different Priorities and Inter-RAT Cells To enable a terminal to reselect a cell in a positioning area, it needs to be ensured that a priority of a first-type cell is higher than a priority of a second-type cell, to increase a possibility of selecting the cell in the positioning area. The first-type cell includes a serving cell, and further includes a cell that is in one or more neighboring cells of the serving cell and that belongs to the positioning area, and the second-type cell includes a cell that is in the one or more neighboring cells of the serving cell and that is other than the cell in the positioning area.

Figure 7:
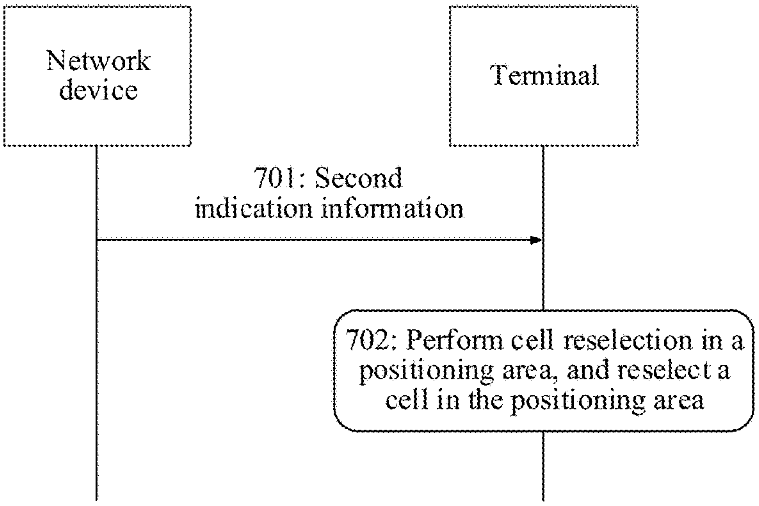
FIG. 7 is a flowchart of a cell reselection method according to an embodiment of this application.

FIG. 7 is a flowchart of a cell reselection method according to an embodiment of this application. The cell reselection method provided in this embodiment of this application may include the following procedure.

701: A network device sends second indication information to a terminal.

In the embodiment corresponding to FIG. 7, the network device may be a network device currently serving the terminal. The network device may be a device, for example, a gNB or an ng-eNB, in an NG RAN.

The second indication information is used by the terminal to learn that a priority of a first-type cell is higher than a priority of a second-type cell. For understanding of the second indication message, refer to the first indication information described in the embodiments corresponding to FIG. 5 and FIG. 6. Details are not described herein again.

In a possible implementation, the second indication information may be carried in a system message (also called: system Information block, SIB), a position system message (also called: position system Information block, Pos SIB), or an RRC message. For example, the network device may reuse existing signaling, for example, a SIB or a Pos SIB to carry the second indication information. In this way, only one piece of signaling needs to be sent, to indicate to a plurality of terminals in one positioning area that a priority of a first-type cell is higher than a priority of a second-type cell. For example, a same positioning area is configured for a first terminal and a second terminal, and serving cells of the first terminal and the second terminal are the same. A priority of a first-type cell may be configured to be higher than a priority of a second-type cell by using one piece of signaling. This configuration may be applicable to each terminal in the positioning area. In addition, for example, the network device may alternatively include the second indication information in RRC signaling, to indicate to a plurality of terminals in a plurality of positioning areas that a priority of a first-type cell of each terminal is higher than a priority of a second-type cell of the terminal. For example, positioning areas configured for a first terminal and a second terminal are different. The positioning area configured for the first terminal is a first positioning area, and the positioning area configured for the second terminal is a second positioning area. The second indication information may be carried in RRC signaling, to separately indicate to the first terminal and the second terminal. Specifically, the second indication information indicates to the first terminal that a priority of a first-type cell Ais higher than a priority of a second-type cell A, and indicates to the second terminal that a priority of a first-type cell B is higher than a priority of a second-type cell B. The first-type cell A and the first-type cell B are different first-type cells, and the two cells include different cells. The second-type cell A and the second-type cell B are different second-type cells, and the two cells include different cells. It should be noted that a specific manner of carrying the second indication information is not limited in embodiments of this application.

In a possible implementation, the second indication information and the first indication information may be carried in a same message. For example, both the first indication information and the second indication information are carried in a SIB, both the first indication information and the second indication information are carried in a Pos SIB, or both the first indication information and the second indication information are carried in an RRC message.

In a possible implementation, the second indication information and the first indication information may be carried in different messages. For example, the first indication information is carried in a SIB, and the second indication information is carried in an RRC message.

In addition, the second indication information may be represented in a plurality of manners. The following provides descriptions with reference to several possible representation manners.

1. The second indication information indicates a priority of a frequency, so that the terminal obtains that the priority of the first-type cell is higher than the priority of the second-type cell.

In a possible implementation, the second indication information carries priorities of different operating frequencies. For example, the second indication information indicates to the terminal that a priority of an operating frequency of the first-type cell is higher than a priority of an operating frequency of the second-type cell.

That the network device configures the positioning area for the terminal device by using the first indication information is described above. For example, the first indication information may carry one or more cell index lists, each cell index list corresponds to one positioning area, and one cell index included in each cell index list corresponds to one cell. The network device knows each cell included in the positioning area, and may configure a priority of a frequency of the cell included in the positioning area, and sends a configuration result to the terminal by using the second indication information. For example, in a possible implementation, a priority of a frequency of a serving cell may be configured to be the same as a priority of a frequency of a cell that is in one or more neighboring cells of the serving cell and that belongs to the positioning area (the cell that is in the one or more neighboring cells of the serving cell and that belongs to the positioning area is referred to as a first-type neighboring cell below), and higher than a priority of a frequency of a cell that is in the one or more neighboring cells of the serving cell and that does not belong to the positioning area (the cell that is in the one or more neighboring cells of the serving cell and that does not belong to the positioning area is referred to as a second-type neighboring cell below). In a possible implementation, the priority of the frequency of the serving cell may be configured to be different from the priority of the frequency of the first-type neighboring cell, but both priorities are higher than the priority of the frequency of the second-type neighboring cell.

Figure 8:
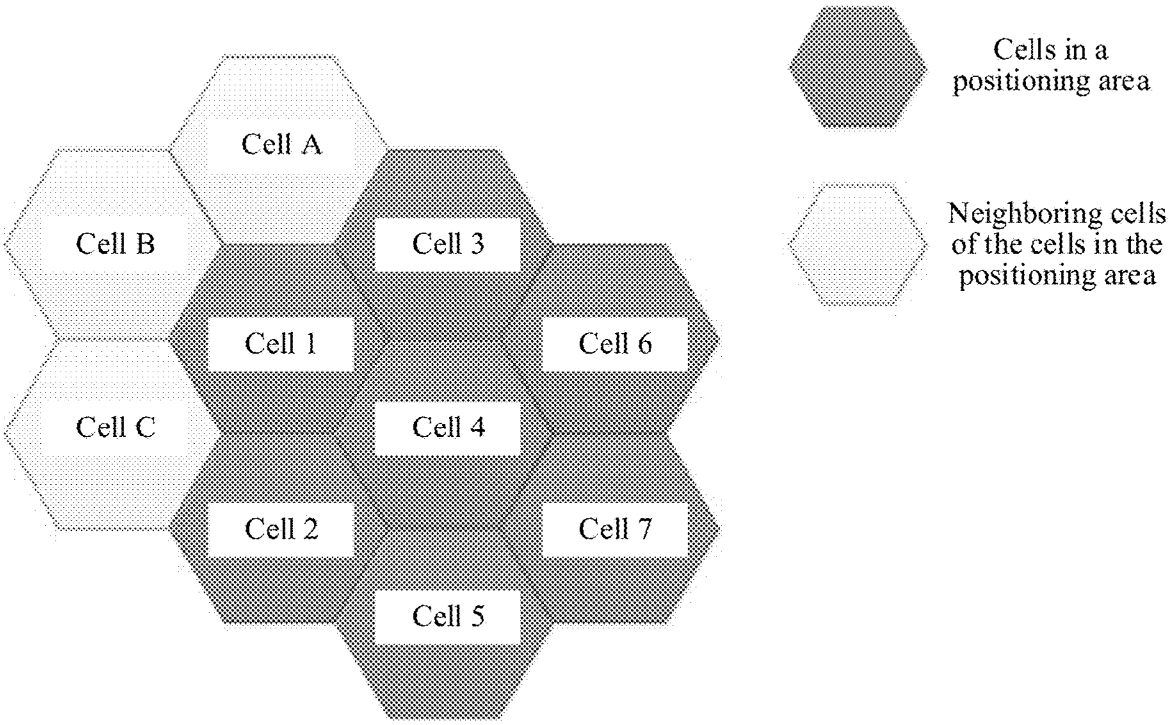
FIG. 8 is a schematic diagram of a scenario of a cell reselection method according to an embodiment of this application.

To display the implementation more intuitively, the following provides explanations and descriptions with reference to FIG. 8. As shown in FIG. 8, assuming that a serving cell is a cell 1, neighboring cells include a cell A, a cell B, a cell C, a cell 2, a cell 4, and a cell 3. It is assumed that cells in a positioning area include the cell 1 to a cell 7. In this case, the cell 2, the cell 3, and the cell 4 in the neighboring cells of the serving cell are cells that are in the neighboring cells of the serving cell and that belong to the positioning area, and are referred to as first-type neighboring cells below. The cell A, the cell B, and the cell C are cells in the neighboring cells of the serving cell and that do not belong to the positioning area, and are referred to as second-type neighboring cells below. Assuming that frequencies of the cell 3, the cell 4, and the cell 2 are all 1, frequencies of the cell A, the cell B, and the cell C are all 2, and a frequency of the cell 1 is a frequency 3, in a possible implementation, the network device may indicate, by using the second indication information, to the terminal device that priorities of the frequency 1 and the frequency 3 are higher than a priority of the frequency 2. For example, the second indication information indicates that the priority of the frequency 1 is 7, the priority of the frequency 3 is 7, and the priority of the frequency 2 is 3. A larger value of the priority indicates a higher priority. Assuming that frequencies of the cell 3, the cell 4, the cell 2, and the cell 1 are all 1, and frequencies of the cell A, the cell B, and the cell C are all 2, in a possible implementation, the network device may indicate, by using the second indication information, to the terminal device that a priority of the frequency 1 is higher than a priority of the frequency 2.

The following describes embodiments of this application with reference to a code segment defined in the 3rd generation partnership project (3GPP) protocol technical specifications. In a possible implementation, in embodiments of this application, a value of a priority-related parameter of a first-type cell in the 3GPP technical specifications may be adjusted, to increase the priority of the first-type cell. For example, in the following code segment, CellReselectionPriorities indicates a frequency priority list. In this embodiment of this application, a value of SEQUENCE in the list may be adjusted. For example, cellReselectionPriorit indicates an integer part of a priority, and cellReselectionSubPriority indicates a decimal part of the priority. The two parts form a value of the priority. A larger value indicates a higher priority. The value of the priority is adjusted to ensure that the priority of the first-type cell is higher than the priority of the second-type cell.

```
  CellReselectionPriorities ::=                    SEQUENCE {
      freqPriorityListEUTRA                                 FreqPriorityListEUTRA
OPTIONAL,                                       -- Need M
      freqPriorityListNR                                      FreqPriorityListNR
OPTIONAL,                                       -- Need M
  t320                                                  ENUMERATED {min5, min10, min20,
```

-continued

```
min30, min60, min120, min180, spare1} OPTIONAL,              -- Need R
  }
  FreqPriorityNR ::=                                 SEQUENCE {
     carrierFreq                                          ARFCN-ValueNR,
     cellReselectionPriority                           CellReselectionPriority,
  cellReselectionSubPriority                                 CellReselectionSubPriority
OPTIONAL                                       -- Need R
  }
```

In a possible implementation, it is specified in a protocol that when a priority is configured by using a SIB, a priority of a serving cell is configured in a SIB 2, priorities of inter-frequency cells are configured in a SIB 4, and priorities of inter-RAT cells are configured in a SIB 5. This specification may also be reused in the solutions provided in embodiments of this application, and priorities of different types of cells are configured by using different SIBs. Details are not described below again.

2. The second indication information carries a first adjustment value.

The network device may send a priority of each frequency through broadcast by using a SIB. For example, a priority of a frequency of a serving cell is configured in a SIB 2, priorities of frequencies of inter-frequency cells are configured in a SIB 4, and priorities of frequencies of inter-RAT cells are configured in a SIB 5. In the solutions provided in embodiments of this application, a first adjustment parameter may be carried in a SIB, so that a terminal that receives the SIB adjusts a priority of a frequency of a cell in the positioning area based on the first adjustment parameter. In a possible implementation, only a terminal that receives the SIB and that is used for positioning may be enabled to adjust the priority of the frequency of the cell in the area based on the first adjustment parameter, and a terminal of a type other than the terminal used for positioning ignores the first adjustment parameter.

In a possible implementation, after obtaining the first adjustment value, the terminal performs calculation with an original priority of the frequency of the cell in the positioning area, to increase the priority of the frequency of the cell in the positioning area. For example, the first adjustment value may be added to the priority of the original frequency, and a result obtained through the addition is used as a final priority of the frequency of the cell; or the first adjustment value is multiplied by the original priority, and a result obtained through the multiplication is used as a final priority of the frequency of the cell. For example, a value range of the original priority of the frequency of the cell is [0, 8]. In a possible implementation, a value range of the first adjustment value may be set to [0, 8]. Assuming that the original priority of the frequency of the cell in the positioning area is 5 and the first adjustment value is 2, the first adjustment value and the original priority of the frequency are calculated. For example, 5+2=7, and 7 is used as the final priority of the frequency of the cell in the positioning area. For another example, the first adjustment value and the original priority of the frequency are calculated. For example, 5*2, and 10 is used as the final priority of the frequency of the cell in the positioning area.

In a possible implementation, the original priority of the frequency of the cell in the positioning area may alternatively be replaced with the first adjustment value. For example, assuming that the original priority of the frequency of the cell in the positioning area is 5, and the first adjustment value is 8, the original priority 5 is replaced with the first adjustment value 8, and the final priority of the frequency of the cell in the positioning area is updated to 8.

The following describes embodiments of this application with reference to a code segment defined in the 3rd generation partnership project (3GPP) protocol technical specifications. In a possible implementation, in embodiments of this application, additional code for defining the first adjustment parameter may be added to a code segment that is related to a priority of a first-type cell and that is in the 3GPP technical specifications. For example, a code segment related to priorityOffset is added to define the first adjustment value as an offset value, so that the terminal adds the first adjustment value and the priority of the original frequency, and uses a result obtained through the addition as the final priority of the frequency of the cell. For another example, a code segment related to scalingFactor is added to define the first adjustment value as a scaling value, so that the terminal multiplies the first adjustment value and the priority of the original frequency, and uses a result obtained through the addition as the final priority of the frequency of the cell. For another example, a code segment related to cellReselectionPriorityPos and cellReselectionSubPriorityPos is added to define a case in which the original priority of the frequency is replaced with the first adjustment value.

```
  InterFreqCarrierFreqInfo ::=               SEQUENCE {
     dl-CarrierFreq                                 ARFCN-ValueNR,
     frequencyBandList                                 MultiFrequencyBandListNR-SIB
OPTIONAL,     -- Cond Mandatory
     frequencyBandListSUL                              MultiFrequencyBandListNR-SIB
OPTIONAL,     -- Need R
     nrofSS-BlocksToAverage                                      INTEGER
(2..maxNrofSS-BlocksToAverage)                    OPTIONAL,     -- Need S
     ...
     cellReselectionPriority                                   CellReselectionPriority
OPTIONAL,     -- Need R
     cellReselectionSubPriority                              CellReselectionSubPriority
OPTIONAL,     -- Need R
  priorityOffset                              INTEGER (0..7)
  scalingFactor                               INTEGER (1..8)
  cellReselectionPriorityPos                 CellReselectionPriority
```

-continued

```
  cellReselectionSubPriorityPos            CellReselection SubPriority
  q-OffsetFreq                               Q-OffsetRange DEFAULT dB0,
     interFreqNeighCellList                                   InterFreqNeighCellList
OPTIONAL,     -- Need R
     interFreqBlackCellList                                   InterFreqBlackCellList
OPTIONAL,     -- Need R
```

3. The second indication information indicates a priority of a cell identifier, so that the terminal obtains that the priority of the first-type cell is higher than the priority of the second-type cell.

In a possible implementation, the second indication information carries priorities of different cell identifiers. For example, the second indication information indicates to the terminal that a priority of an identifier of the first-type cell is higher than a priority of an identifier of the second-type cell.

In a possible implementation, a priority of a serving cell may be configured to be the same as a priority of a first-type neighboring cell, and higher than a priority of a second-type neighboring cell. In a possible implementation, a priority of a serving cell may be configured to be different from a priority of a first-type neighboring cell, but both priorities are higher than a priority of a second-type neighboring cell.

The following provides explanations and descriptions with reference to FIG. 8. As shown in FIG. 8, assuming that a serving cell is a cell 1, neighboring cells include a cell A, a cell B, a cell C, a cell 2, a cell 4, and a cell 3. It is assumed that cells in a positioning area include the cell 1 to a cell 7. In this case, the cell 2, the cell 3, and the cell 4 in the neighboring cells of the serving cell are cells that are in the neighboring cells of the serving cell and that belong to the positioning area, and are referred to as first-type neighboring cells below. The cell A, the cell B, and the cell C are cells in the neighboring cells of the serving cell and that do not belong to the positioning area, and are referred to as second-type neighboring cells below. In a possible implementation, the network device may indicate, to the terminal device by using the second indication information, that a priority of any one of a cell identifier 1, a cell identifier 3, a cell identifier 4, a cell identifier 5, and a cell identifier 2 is higher than a priority of any one of a cell identifier A, a cell identifier B, and a cell identifier C. For example, the second indication information indicates that the priority of any one of the cell identifier 1, the cell identifier 3, the cell identifier 4, the cell identifier 5, and the cell identifier 2 is 7, and indicates that the priority of any one of the cell identifier A, the cell identifier B, and the cell identifier C is 3, where a larger value of the priority indicates a higher priority.

4. The second indication information indicates that a priority of a cell in the positioning area is higher than a priority of a neighboring cell of the cell in the positioning area.

In this implementation, the network device does not directly indicate a priority of a frequency or a priority of a cell identifier, but indicates that the priority of the cell in the positioning area is higher than the priority of the neighboring cell of the cell in the positioning area, to ensure that in a cell reselection process, if a cell in the positioning area exists in candidate cells, the cell in the positioning area is reselected, and a cell outside the positioning area is not reselected.

Figure 9:
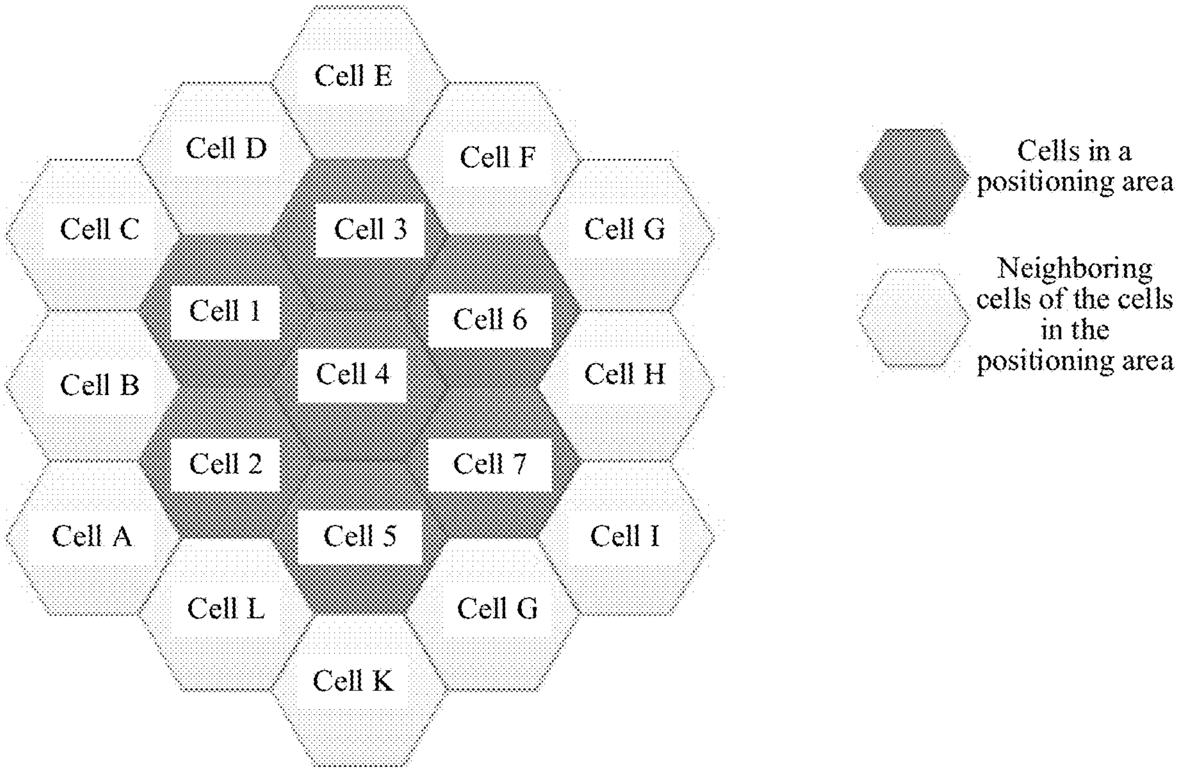
FIG. 9 is a schematic diagram of a scenario of a cell reselection method according to an embodiment of this application.

The following uses an example for description with reference to FIG. 9. Assuming that cells in a positioning area include a cell 1 to a cell 7, the network device indicates to the terminal device that priorities of the cell 1 to the cell 7 are higher than a priority of a cell, other than the cells included in the positioning area, in one or more neighboring cells of any one of the cell 1 to the cell 7. For example, in the scenario shown in FIG. 9, cells, other than the cells included in the positioning area, in the one or more neighboring cells of any one of the cell 1 to the cell 7 include a cell A to a cell L. Therefore, a priority of any one of the cell 1 to the cell 7 is higher than a priority of any one of the cell A to the cell L.

It should be noted that various embodiments provided in embodiments of this application may be combined. For example, in a possible implementation, the second indication information may indicate that a priority of a frequency of a cell in the positioning area is higher than a priority of a frequency of a cell, other than the cell in the positioning area, in one or more neighboring cells of the cell in the positioning area.

702: The terminal performs cell reselection in the positioning area, and reselects a cell in the positioning area.

After receiving third indication information of the network device, the terminal may learn that the priority of the first-type cell is higher than the priority of the second-type cell. The third indication information has been described in detail in 701, and details are not described herein again.

Corresponding to the plurality of representation manners of the second indication information described in 701, the terminal may learn, in different manners, that the priority of the frequency of the first-type cell is higher than the priority of the frequency of the second-type cell. For details, refer to related descriptions in 701. Details are not described herein again.

The first-type cell and the second-type cell are understood with reference to related descriptions of the first-type cell and the second-type cell in 701. Details are not described herein again.

When a cell reselection condition is satisfied, for inter-frequency cells having different priorities in the candidate cells, if the cells include the cell in the positioning area, because of the configuration in 701, the priority of the cell in the positioning area is definitely higher than a priority of the cell in a non-positioning area in the candidate cells, and therefore the terminal reselects the cell in the positioning area. Herein, with reference to FIG. 8, it is assumed that a serving cell of the terminal is a cell 1, the terminal is triggered to start a cell reselection procedure in the cell 1, and neighboring cells include a cell A, a cell B, a cell C, a cell 2, a cell 4, and a cell 3. The neighboring cells and the serving cell can be used as candidate cells. If the candidate cells are inter-frequency cells having different priorities, the terminal finally reselects a highest-priority cell according to a cell reselection rule. Because a priority of any one of the cell 2, the cell 4, and the cell 3 is definitely higher than a priority of any one of the cell A, the cell B, and the cell C, the terminal definitely reselects a cell in a positioning area, for example, any one of the cell 2, the cell 4, and the cell 3, but does not reselect any one of the cell A, the cell B, and the cell C.

The foregoing describes how to enable a terminal to reselect a cell in a positioning area after starting a cell reselection procedure in a scenario of inter-frequency cells having different priorities and inter-RAT cells. The following describes how to enable a terminal to reselect a cell in a positioning area after starting a cell reselection procedure in a scenario of inter-frequency cells having a same priority and intra-frequency cells.

II. Inter-Frequency Cells Having a Same Priority and Intra-Frequency Cells

If candidate cells belong to a same frequency, or candidate cells have different frequencies but have a same priority, when performing cell reselection, a terminal needs to first determine whether cells satisfy the S criterion, and then determine whether a cell that satisfies the S criterion satisfies the R criterion. To enable the terminal to reselect a cell in a positioning area, it needs to ensure that an R value of a first-type cell is greater than an R value of a second-type cell, so as to increase a possibility of selecting the cell in the positioning area. The first-type cell and the second-type cell are understood with reference to the foregoing descriptions of the first-type cell and the second-type cell. Details are not described herein again.

Figure 10:
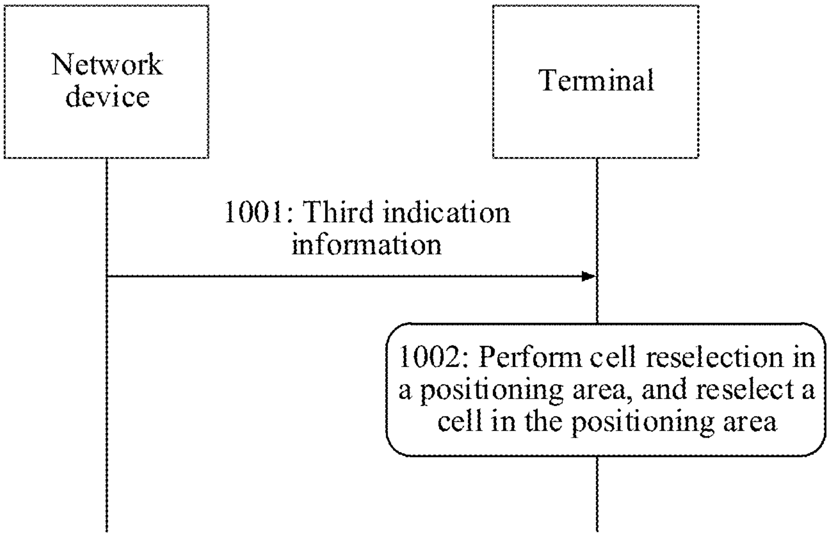
FIG. 10 is a flowchart of a cell reselection method according to an embodiment of this application.

FIG. 10 is a flowchart of a cell reselection method according to an embodiment of this application. The cell reselection method provided in this embodiment of this application may include the following steps.

1001: A network device sends third indication information to a terminal.

For understanding of the network device, refer to the network device described in the embodiment corresponding to FIG. 7. Details are not described herein again.

The third indication information is used by the terminal to learn that an R value of a first-type cell is greater than an R value of a second-type cell.

In a possible implementation, the third indication information may be carried in a SIB, a Pos SIB, or an RRC message. For example, the network device may reuse existing signaling, for example, a SIB or a Pos SIB to carry the third indication information. In this way, only one piece of signaling needs to be sent, to indicate a plurality of terminals in one positioning area, where the R value of the first-type cell is greater than the R value of the second-type cell. For example, a same positioning area is configured for a first terminal and a second terminal, and serving cells of the first terminal and the second terminal are the same. The R value of the first-type cell may be configured to be greater than the R value of the second-type cell by using one piece of signaling. This configuration may be applicable to each terminal in the positioning area. In addition, for example, the network device may alternatively include the second indication information in RRC signaling, to indicate a plurality of terminals in a plurality of positioning areas, where an R value of each first-type cell is greater than an R value of a second-type cell corresponding to the first-type cell. For example, positioning areas configured for a first terminal and a second terminal are different. The positioning area configured for the first terminal is a first positioning area, and the positioning area configured for the second terminal is a second positioning area. The third indication information may be carried in RRC signaling, to separately indicate to the first terminal and the second terminal. Specifically, the third indication information indicates to the first terminal that an R value of a first-type cell A is greater than an R value of a second-type cell A, and indicates to the second terminal that an R value of a first-type cell B is greater than an R value of a second-type cell B. The first-type cell A and the first-type cell B are different first-type cells, and the two cells include different cells. The second-type cell A and the second-type cell B are different second-type cells, and the two cells include different cells. It should be noted that a specific manner of carrying the second indication information is not limited in embodiments of this application.

In a possible implementation, the third indication information, second indication information, and a first indication information may be carried in a same message. For example, the third indication information, the second indication information, and the first indication information are all carried in a SIB; or the third indication information, the first indication information, and the second indication information are all carried in a Pos SIB; or the third indication information, the first indication information, and the second indication information are all carried in an RRC message.

In a possible implementation, the third indication information, the first indication information, and the second indication information are carried in different messages. For example, the first indication information is carried in a SIB, the second indication information is carried in an RRC message, and the third indication information is carried in an RRC message.

In addition, the third indication information may be represented in a plurality of manners. The following provides descriptions with reference to several possible representation manners.

1. The third indication information carries a second adjustment value.

After obtaining the second adjustment value, the terminal adjusts the R criterion based on the second adjustment value, to increase the R value of the first-type cell or decrease the R value of the second-type cell.

The foregoing describes formula 1-4: Rn=Qmeas,n-Qoffset-$Qoffset_{temp}$.

The following several implementations describe a solution for increasing the R value of the first-type cell:

Manner 1: In a possible implementation, after obtaining the second adjustment value, the terminal increases a value of Rn of the first-type cell based on the second adjustment value. For example, Rn is modified according to the following formula 1-5:

$$Rn = Qmeas, n - Qoffset - Qoffset_{temp} + Qoffsetdeta \tag{1-5}$$

The parameter Qoffsetdeta represents the second adjustment value, and Qoffsetdeta may be a real number greater than 0.

Manner 2: In a possible implementation, after obtaining the second adjustment value, the terminal increases a value of Rn of the first-type cell based on the second adjustment value. For example, Rn is modified according to the following formula 1-6:

$$Rn = Qmeas, n - Qoffset * N - Offset_{temp} \tag{1-6}$$

The parameter N represents the second adjustment value, and N may be a real number greater than 0 and less than 1.

Manner 1 and Manner 2 are described below with reference to a code segment defined in the 3GPP protocol technical specifications. In a possible implementation, in embodiments of this application, additional code for defining the second adjustment parameter may be added to the cell reselection code segment in the 3GPP technical specifications. For example, the second adjustment value is defined as an offset value by adding a code segment related to q-OffsetDelta, that is, Qoffsetdeta in the foregoing formula 1-5 is defined. For another example, the second adjustment value is defined as a scaling value by using a code segment related to scalingFactor, that is, N in the foregoing formula 1-6 is defined.

```
IntraFreqNeighCellInfo ::=      SEQUENCE {
    physCellId                      PhysCellId,
    q-OffsetCell                    Q-OffsetRange,
    q-OffsetDelta                   Q-OffsetRange,
    scalingFactor                   ENUMERATED {oDot2, oDot4,
oDot6, oDot8}
    q-RxLevMinOffsetCell               INTEGER (1..8)
OPTIONAL,   -- Need R
    q-RxLevMinOffsetCellSUL            INTEGER (1..8)
OPTIONAL,   -- Need R
    q-QualMinOffsetCell                INTEGER (1..8)
OPTIONAL,   -- Need R
```

Manner 3: In a possible implementation, after obtaining the second adjustment value, the terminal may alternatively increase a value of Rn of the first-type cell based on the second adjustment value. For example, Rn is modified according to the following formula 1-7:

$$Rn = M * Qmeas, n - Qoffset - Qoffset_{temp} \quad (1-7)$$

The parameter M represents the second adjustment value, and M may be a real number greater than 1.

The following describes, with reference to implementations, a solution for decreasing the R value of the second-type cell.

Manner 4: In a possible implementation, after obtaining the second adjustment value, the terminal decreases a value of Rn of the second-type cell based on the second adjustment value. For example, Rn is modified according to the following formula 1-5:

$$Rn = Qmeas, n - Qoffset - Qoffset_{temp} - Q1 \quad (1-5)$$

The parameter Q1 represents the second adjustment value, and Q1 may be a real number greater than 0.

Manner 5: In a possible implementation, after obtaining the second adjustment value, the terminal decreases a value of Rn of the second-type cell based on the second adjustment value. For example, Rn is modified according to the following formula 1-6:

$$Rn = Qmeas, n - Qoffset * N1 - Qoffset_{temp} \quad (1-6)$$

The parameter N1 represents the second adjustment value, and N may be a real number greater than 1.

Manner 6: In a possible implementation, after obtaining the second adjustment value, the terminal may alternatively decrease a value of Rn of the second-type cell based on the second adjustment value. For example, Rn is modified according to the following formula 1-7:

$$Rn = M1 * Qmeas, n - Qoffset - Qoffset_{temp} \quad (1-7)$$

The parameter M represents the second adjustment value, and M may be a real number greater than 0 and less than 1.

In the implementations described in the manner 1 to the manner 6, the third indication information carries a specific second adjustment value, so that the terminal increases the R value of the first-type cell or decreases the R value of the second-type cell based on the specific second adjustment value. In addition, in a possible implementation, the third indication information may alternatively not carry a specific second adjustment value, but only indicate the terminal to increase the R value of the first-type cell or decrease the R value of the second-type cell, and the terminal freely adjusts the R value of the first-type cell or the R value of the second-type cell. The following describes this implementation with reference to specific implementations.

2. The third indication information indicates to the terminal that the R value of the first-type cell is greater than the R value of the second-type cell.

In a possible implementation, when obtaining, based on the third indication information, that the R value of the first-type cell needs to be increased, the terminal may increase the R value of the first-type cell based on a prestored adjustment value.

In a possible implementation, when obtaining, based on the third indication information, that the R value of the second-type cell needs to be decreased, the terminal may decrease the R value of the second-type cell based on a prestored adjustment value.

In a possible implementation, the terminal obtains, based on the third indication information, that the R value of the first-type cell is greater than the R value of the second-type cell. In this implementation, after the terminal starts a cell reselection procedure, candidate cells include the first-type cell and the second-type cell, and therefore, the second-type cell is excluded, and a reselected cell is obtained only from the first-type cell.

1002: The terminal performs cell reselection in the positioning area, and reselects a cell in the positioning area.

When a cell reselection condition is satisfied, for inter-frequency cells having a same priority and intra-frequency cells in the candidate cells, if the cells include the cell in the positioning area, because of the configuration in step 1001, an R value of the cell in the positioning area is definitely greater than an R value of a cell in a non-positioning area in the candidate cells, the terminal reselects the cell in the positioning area.

After the terminal reselects the cell in the positioning area, according to the solution described in FIG. 5 or FIG. 6, the terminal can complete a positioning procedure based on the obtained SRS resource according to the solution described in FIG. 5 or FIG. 6, without needing to re-establish an RRC connection or re-obtain an SRS resource in the reselected cell, to decrease power consumption of the terminal.

In the foregoing embodiments provided in this application, the method provided in embodiments of this application is described from a perspective of interaction between the terminal and the network device. To implement functions in the foregoing method provided in embodiments of this application, the terminal, the network device, and the location management device may include a hardware structure and/or a software module, to implement the foregoing functions in a form of the hardware structure, the software module, or a combination of the hardware structure and the software module. Whether one of the functions is implemented by using the hardware structure, the software module, or the combination of the hardware structure and the software module depends on a particular application and a design constraint condition of the technical solutions.

With reference to the accompanying drawings, the following describes apparatuses configured to implement the foregoing methods in embodiments of this application. Therefore, the foregoing content may be used in subsequent embodiments, and repeated content is not described again.

Figure 11:
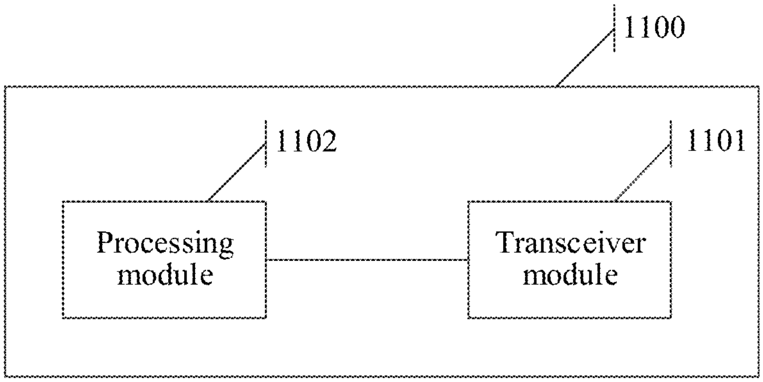
FIG. 11 is a schematic diagram of a structure of a communication apparatus according to an embodiment of this application.

FIG. 11 is a possible example block diagram of a communication apparatus in this application. The communication apparatus 1100 may correspondingly implement a function or a step implemented by the terminal, the network device, or the location management device in the foregoing method embodiments. The communication apparatus may include a transceiver module 1101 and a processing module 1102. Optionally, the apparatus may further include a storage module. The storage module may be configured to store instructions (code or programs) and/or data. The transceiver module 1101 and the processing module 1102 may be coupled to the storage module. For example, the processing module 1102 may read the instructions (the code or the program) and/or the data in the storage module, to implement a corresponding method. The foregoing modules may be disposed independently, or may be partially or totally integrated.

It should be understood that the processing module 1102 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 1102 may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The transceiver module 1101 is an interface circuit of the apparatus, and is configured to receive a signal from another apparatus. For example, when the apparatus is implemented in a form of a chip, the transceiver module 1101 is an interface circuit used by the chip to receive a signal from another chip or apparatus, or is an interface circuit used by the chip to send a signal to another chip or apparatus.

The communication apparatus 1100 may be the network device, the terminal, or the location management device in the foregoing embodiments, or may be a chip used in the network device, the terminal, or the location management device. For example, when the communication apparatus 1100 is the network device, the terminal, or the location management device, the processing module 1102 may be, for example, a processor, and the transceiver module 1101 may be, for example, a transceiver. Optionally, the transceiver may include a radio frequency circuit, and the storage unit may be, for example, a memory. For example, when the communication apparatus 1100 is the chip used in the network device, the terminal, or the location management device, the processing module 1102 may be, for example, a processor, and the transceiver module 1101 may be, for example, an input/output interface, a pin, or a circuit. The processing module 1102 may execute computer-executable instructions stored in the storage unit. Optionally, the storage unit is a storage unit in the chip, for example, a register or a buffer. Alternatively, the storage unit may be a storage unit that is in the network device, the terminal, or the location management device and that is located outside the chip, for example, a read-only memory (ROM), another type of static storage device that can store static information and instructions, or a random access memory (RAM).

In some possible implementations, the communication apparatus 1100 can correspondingly implement behavior and functions of the terminal in the foregoing method embodiments. For example, the communication apparatus 1100 may be a terminal, or may be a component (for example, a chip or a circuit) used in the terminal. The transceiver module 1101 may be configured to support communication between the terminal and another network entity, for example, support communication between the terminal and the network device and/or the location management device shown in FIG. 5 or FIG. 6; and for another example, support communication between the terminal and the network device shown in FIG. 7 or FIG. 10.

The processing module 1102 is configured to control and manage an action of the terminal. For example, the processing module 1102 is configured to support the terminal in performing all operations, other than sending and receiving operations, of the terminal in FIG. 5 or FIG. 6. For another example, the processing module 1102 is configured to support the terminal in performing all operations, other than sending and receiving operations, of the terminal in FIG. 7 or FIG. 10.

For example, the transceiver module 1101 may be configured to perform all receiving or sending operations performed by the terminal in the embodiment shown in FIG. 5, for example, S501, S502, S503, S504, S502*a*, S503*a*, and S504*a* in the embodiment shown in FIG. 5, and/or configured to support another process of the technology described in this specification. The processing module 1102 is configured to perform all operations, other than the sending and receiving operations, performed by the terminal in the embodiment shown in FIG. 5, for example, S505 in the embodiment shown in FIG. 5, and/or configured to support another process of the technology described in this specification.

For another example, the transceiver module 1101 may be configured to perform all receiving or sending operations performed by the terminal in the embodiment shown in FIG. 6, for example, S601, S604, S605, and S6011 in the embodiment shown in FIG. 6, and/or configured to support another process of the technology described in this specification. The processing module 1102 is configured to perform all operations, other than the sending and receiving operations, performed by the terminal in the embodiment shown in FIG. 6, and/or configured to support another process of the technology described in this specification.

For another example, the transceiver module 1101 may be configured to perform all receiving or sending operations performed by the terminal in the embodiment shown in FIG. 7, for example, 701 in the embodiment shown in FIG. 7, and/or configured to support another process of the technology described in this specification. The processing module 1102 is configured to perform all operations, other than the sending and receiving operations, performed by the terminal in the embodiment shown in FIG. 7, and/or configured to support another process of the technology described in this specification.

For another example, the transceiver module 1101 may be configured to perform all receiving or sending operations performed by the terminal in the embodiment shown in FIG. 10, for example, 1001 in the embodiment shown in FIG. 10, and/or configured to support another process of the technology described in this specification. The processing module 1102 is configured to perform all operations, other than the sending and receiving operations, performed by the terminal in the embodiment shown in FIG. 10, and/or configured to support another process of the technology described in this specification.

In some embodiments, the transceiver module 1101 is configured to receive first indication information and a first message, where the first indication information indicates one or more positioning areas, and/or a plurality of cells included in each of the one or more positioning areas, the first message includes one or more pieces of resource configuration information, each piece of resource configuration information is used to configure a reference signal resource, the reference signal resource is used by the communication apparatus to send a reference signal, the reference signal is used to determine a location of the communication apparatus, and one piece of resource configuration information corresponds to one positioning area; and the transceiver module 1101 is further configured to send, in the positioning area indicated by the first indication information, the reference signal based on the resource configuration information corresponding to the positioning area.

In an optional implementation, after the communication apparatus 1100 is handed over from a first cell to a second cell, if determining that the second cell is in a first positioning area, the processing module 1102 is configured to determine to send the reference signal based on first resource configuration information corresponding to the first positioning area, where the first cell is in the first positioning area.

In an optional implementation, the transceiver module 1101 is further configured to receive second indication information, where the second indication information indicates one or more positioning areas, and/or a plurality of cells included in each of the one or more positioning areas, and a priority of the second indication information is higher than a priority of the first indication information.

The transceiver module 1101 is further configured to send, in the positioning area indicated by the second indication information, the reference signal based on resource configuration information corresponding to the positioning area.

In an optional implementation, the first indication information includes one or more positioning area indexes, and one positioning area index corresponds to one positioning area.

In an optional implementation, the first indication information includes one or more cell index lists, one cell index list corresponds to one positioning area, and one cell index in one cell index list corresponds to one cell.

In an optional implementation, cell indexes included in different cell index lists are partially the same.

In an optional implementation, the processing module 1102 is configured to: after the communication apparatus 1100 is handed over from the first cell to the second cell, obtain a cell index of the second cell; and if determining that the cell index of the second cell is in a first cell index list, determine to send the reference signal based on first resource configuration information corresponding to the first cell index list; or if determining that a cell index of the second cell is in a second cell index list, obtain second resource configuration information corresponding to the second cell index list, and determine to send the reference signal based on the second resource configuration information, where a cell index of the first cell is in the first cell index list.

In an optional implementation, the first indication information further includes one or more reference signal resource indexes, and one reference signal resource index corresponds to one positioning area or one cell index list.

In an optional implementation, the processing module 1102 is configured to: after the communication apparatus 1100 is handed over from the first cell to the second cell, if determining that the second cell is in a third cell index list, determine a reference signal resource index corresponding to the third cell index list; and the transceiver module 1101 is configured to send the reference signal based on a reference signal resource corresponding to the reference signal resource index.

In an optional implementation, the transceiver module 1101 is further configured to send a second message, where the second message includes one or more of the following information: positioning precision information, battery capacity information of the communication apparatus 1100, and energy saving requirement information of the communication apparatus 1100.

In an optional implementation, the first indication information is determined based on the second message.

In an optional implementation, the first indication information is carried in a SIB, a Pos SIB, an RRC message, or an LPP message.

In an optional implementation, the transceiver module 1101 is configured to receive first indication information, where the first indication information indicates one or more positioning areas, each of the one or more positioning areas includes a plurality of cells, the plurality of cells included in the positioning area use same resource configuration information, the resource configuration information is used to configure a reference signal resource, the reference signal resource is used by a terminal to send a reference signal, and the reference signal is used to determine a location of the terminal. The processing module 1102 is used by the terminal to perform cell reselection in the positioning area indicated by the first indication information, and the terminal reselects the cell included in the positioning area.

In an optional implementation, the transceiver module 1101 is further configured to receive second indication information, where the second indication information is used by the terminal to learn that a priority of a first-type cell is higher than a priority of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In an optional implementation, the processing module 1102 is used by the terminal to perform cell reselection in the positioning area indicated by the first indication information, and obtain that candidate cells include the first-type cell and the second-type cell, where the first-type cell and the second-type cell belong to inter-frequency cells having different priorities or belong to inter-radio access technology RAT cells; and reselect, between the first-type cell and the second-type cell, the first-type cell having the higher priority.

In an optional implementation, the second indication information indicates to the terminal that a priority of a frequency of the first-type cell is higher than a priority of a frequency of the second-type cell.

In an optional implementation, the second indication information indicates that a priority of a cell corresponding to a first-type identifier is higher than a priority of a cell corresponding to a second-type identifier. The first-type identifier includes an identifier of each cell in the first-type cell, and the second-type identifier includes an identifier of each cell in the second-type cell.

In an optional implementation, the second indication information carries a first adjustment value, the first adjustment value is used to perform an operation with a value of a first target parameter or a value of a second target parameter, to increase the value of the first target parameter or decrease a value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell.

In an optional implementation, the second indication information is carried in a system message SIB, a position system message Pos SIB, or a radio resource control RRC message.

In an optional implementation, the transceiver module 1101 is further configured to receive third indication information, where the third indication information is used by the terminal to learn that an R value of a first-type cell is greater than an R value of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In an optional implementation, the processing module 1102 is configured to: perform cell reselection in the positioning area indicated by the first indication information, and obtain that candidate cells include the first-type cell and the second-type cell, where the first-type cell and the second-type cell belong to inter-frequency cells having a same priority or intra-frequency cells; and reselect, between the first-type cell and the second-type cell, the first-type cell having the larger R value.

In an optional implementation, the third indication information carries a second adjustment value, the second adjustment value is used to perform an operation with a value of a third target parameter or a value of a fourth target parameter, to decrease the value of the third target parameter or increase the value of the fourth target parameter, the third target parameter is a temporary offset of the first-type cell, a reselection offset of the first-type cell, or an RSRP of the first-type cell; and the fourth target parameter is a temporary offset of the second-type cell, a reselection offset of the second-type cell, or an RSRP of the second-type cell.

In an optional implementation, the second adjustment value is used to enable the operation with the value of the third target parameter to satisfy a formula:

$$Rn = Qmeas,\ n - Qoffset - Qoffset_{temp} + Qoffsetdeta;\ \text{or}$$

$$Rn = Qmeas,\ n - Qoffsest * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell.

In an optional implementation, the third indication information is carried in a system message SIB, a position system message Pos SIB, or a radio resource control RRC message.

It should be understood that in this embodiment of this application, the processing module 1102 may be implemented by a processor or a processor-related circuit component, and the transceiver module 1101 may be implemented by a transceiver or a transceiver-related circuit component.

In some possible implementations, the communication apparatus 1100 can correspondingly implement behavior and functions of the network device in the foregoing method embodiments. For example, the communication apparatus 1100 may be a network device, or may be a component (such as a chip or a circuit) used in the network device. The transceiver module 1101 may be configured to support communication between the network device and another network entity, for example, support communication between the network device and the terminal shown in FIG. 5 or FIG. 6; and for another example, support communication between the network device and the terminal shown in FIG. 7 or FIG. 10. The processing module 1102 is configured to control and manage an action of the network device. For example, the processing module 1102 is configured to support the network device in performing all operations other than sending and receiving in FIG. 5 or FIG. 6. For another example, the processing module 1102 is configured to indicate the network device to perform all operations other than sending and receiving in FIG. 7 or FIG. 10.

For example, the transceiver module 1101 may be configured to perform all receiving or sending operations performed by the network device in the embodiment shown in FIG. 5, for example, S501, S502, S503, and S504 in the embodiment shown in FIG. 5, and/or configured to support another process of the technology described in this specification. The processing module 1102 is configured to perform all operations, other than the sending and receiving operations, performed by the network device in the embodiment shown in FIG. 5, and/or configured to support another process of the technology described in this specification.

For another example, the transceiver module 1101 may be configured to perform all receiving or sending operations performed by the network device in the embodiment shown in FIG. 6, for example, steps other than S603 in S601 to S611 in the embodiment shown in FIG. 6, and the receiving or sending operations in S601 and S610, and/or configured to support another process of the technology described in this specification. The processing module 1102 is configured to perform all operations, other than the sending and receiving operations, performed by the network device in the embodiment shown in FIG. 6, for example, S603 in the embodiment shown in FIG. 6, and/or configured to support another process of the technology described in this specification.

For another example, the transceiver module 1101 may be configured to perform all receiving or sending operations performed by the network device in the embodiment shown in FIG. 7, for example, 701 in the embodiment shown in FIG. 7, and/or configured to support another process of the technology described in this specification. The processing module 1102 is configured to perform all operations, other than the sending and receiving operations, performed by the network device in the embodiment shown in FIG. 7, and/or configured to support another process of the technology described in this specification.

For another example, the transceiver module 1101 may be configured to perform all receiving or sending operations performed by the network device in the embodiment shown in FIG. 10, for example, 1001 in the embodiment shown in FIG. 10, and/or configured to support another process of the technology described in this specification. The processing module 1102 is configured to perform all operations, other than the sending and receiving operations, performed by the network device in the embodiment shown in FIG. 10, and/or configured to support another process of the technology described in this specification.

In some embodiments, the transceiver module 1101 is configured to send first indication information and a first message, where the first indication information indicates one or more positioning areas, and/or a plurality of cells included in each of the one or more positioning areas, the first message includes one or more pieces of resource configuration information, each piece of resource configuration information is used to configure a reference signal resource, the reference signal resource is used by a terminal to send a reference signal, the reference signal is used to determine a location of the terminal, and one piece of resource configuration information corresponds to one positioning area; the transceiver module 1101 is further configured to receive the reference signal; the processing module 1102 is configured to measure the reference signal to obtain a positioning measurement result, where the positioning measurement result is used to determine the location of the terminal; and the transceiver module 1101 is further configured to send the positioning measurement result to a location management device function.

In an optional implementation, the transceiver module 1101 is further configured to send second indication information, where the second indication information indicates one or more positioning areas, and/or a plurality of cells included in each of the one or more positioning areas, and a priority of the second indication information is higher than a priority of the first indication information.

In an optional implementation, the first indication information includes one or more positioning area indexes, and one positioning area index corresponds to one positioning area.

In an optional implementation, the first indication information includes one or more cell index lists, one cell index list corresponds to one positioning area, and one cell index in one cell index list corresponds to one cell.

In an optional implementation, cell indexes included in different cell index lists are partially the same.

In an optional implementation, the first indication information further includes one or more reference signal resource indexes, and one reference signal resource index corresponds to one positioning area or one cell index list.

In an optional implementation, the transceiver module 1101 is further configured to receive a second message, where the second message includes one or more of the following information: positioning precision information, battery capacity information of the terminal, and energy saving requirement information of the terminal.

In a possible implementation, the processing module 1102 is configured to determine the first indication information based on the second message.

In a possible implementation, the first indication information is carried in a SIB, a Pos SIB, or an RRC message.

The transceiver module 1101 is configured to send first indication information, where the first indication information indicates one or more positioning areas, so that a terminal performs cell reselection in the positioning area indicated by the first indication information, and reselects a cell included in the positioning area, each of the one or more positioning areas includes a plurality of cells, the plurality of cells included in the positioning area use same resource configuration information, the resource configuration information is used to configure a reference signal resource, the reference signal resource is used by a terminal to send a reference signal; and the reference signal is used to determine a location of the terminal.

In a possible implementation, the transceiver module 1101 is further configured to send second indication information, where the second indication information is used by the terminal to learn that a priority of a first-type cell is higher than a priority of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In a possible implementation, the second indication information indicates to the terminal that a priority of a frequency of the first-type cell is higher than a priority of a frequency of the second-type cell.

In a possible implementation, the second indication information indicates that a priority of a cell corresponding to a first-type identifier is higher than a priority of a cell corresponding to a second-type identifier. The first-type identifier includes an identifier of each cell in the first-type cell, and the second-type identifier includes an identifier of each cell in the second-type cell.

In a possible implementation, the second indication information carries a first adjustment value, the first adjustment value is used to perform an operation with a value of a first target parameter or a value of a second target parameter, to increase the value of the first target parameter or decrease the value of the second target parameter, the value of the first target parameter indicates the priority of the first-type cell, the value of the second target parameter indicates the priority of the second-type cell, the value of the first target parameter is positively correlated with the priority of the first-type cell, and the value of the second target parameter is positively correlated with the priority of the second-type cell.

In a possible implementation, the second indication information is carried in a system message SIB, a position system message Pos SIB, or a radio resource control RRC message.

In a possible implementation, the transceiver module 1101 is further configured to send third indication information, where the third indication information is used by the terminal to learn that an R value of a first-type cell is greater than an R value of a second-type cell, the first-type cell includes a serving cell and a cell that is in one or more neighboring cells of the serving cell and that belongs to the positioning area, and the second-type cell is a cell that is in the one or more neighboring cells of the serving cell and that does not belong to the positioning area.

In a possible implementation, the third indication information carries a second adjustment value, the second adjustment value is used to perform an operation with a value of a third target parameter or a value of a fourth target parameter, to decrease the value of the third target parameter or increase the value of the fourth target parameter, and the third target parameter is a temporary offset of the first-type cell, a reselection offset of the first-type cell, or an RSRP of the first-type cell; and the fourth target parameter is a temporary offset of the second-type cell, a reselection offset of the second-type cell, or an RSRP of the second-type cell.

In a possible implementation, the second adjustment value is used to enable the operation with the value of the third target parameter to satisfy a formula:

$$Rn = Qmeas,n - Qoffset - Qoffset_{temp} + Qoffsetdeta; \text{ or}$$

$$Rn = Qmeas,n - Qoffset * N - Qoffset_{temp},$$

where Rn represents the R value of the first-type cell, Qmeas,n represents a received signal strength value measured by the neighboring cell of the serving cell, Qoffset represents the reselection offset of the first-type cell, and $Qoffset_{temp}$ represents the temporary offset of the first-type cell.

In a possible implementation, the third indication information is carried in a system message SIB, a position system message Pos SIB, or a radio resource control RRC message.

It should be understood that in this embodiment of this application, the processing module 1102 may be implemented by a processor or a processor-related circuit component, and the transceiver module 1101 may be implemented by a transceiver or a transceiver-related circuit component.

In some possible implementations, the communication apparatus 1100 can correspondingly implement behavior and functions of the location management device in the foregoing method embodiments. For example, the communication apparatus 1100 may be the location management function, or may be a component (for example, a chip or a circuit) used in a location management device. The transceiver module 1101 may be configured to support communication between the location management device and another network entity, for example, support communication between the location management device and the network device shown in FIG. 5 or FIG. 6. The processing module 1102 is configured to control and manage an action of the location management device. For example, the processing module 1102 is configured to support the location management device in performing all operations, other than sending and receiving operations, in FIG. 5 or FIG. 6.

For example, the transceiver module 1101 may be configured to perform all receiving or sending operations performed by the location management device in the embodiment shown in FIG. 5, for example, S502*a*, S503*a*, and S504*a* in the embodiment shown in FIG. 5, and/or configured to support another process of the technology described in this specification. The processing module 1102 is configured to perform all operations, other than the sending and receiving operations, performed by the location management device in the embodiment shown in FIG. 5.

For another example, the transceiver module 1101 may be configured to perform all receiving or sending operations performed by the location management device in the embodiment shown in FIG. 6, for example, S602, S606 to S609, and S611 in the embodiment shown in FIG. 6, and the receiving or sending operation in S601, and/or configured to support another process of the technology described in this specification. The processing module 1102 is configured to perform all operations, other than the sending and receiving operations, performed by the location management device in the embodiment shown in FIG. 6, and/or configured to support another process of the technology described in this specification.

In some embodiments, the transceiver module 1101 is configured to: send first indication information, and receive a positioning measurement result, where the first indication information indicates one or more positioning areas, and/or a plurality of cells included in each of the one or more positioning areas, the positioning measurement result is obtained by performing measurement based on a reference signal sent by a terminal; and the processing module 1102 is configured to determine a location of the terminal based on the positioning measurement result.

In an optional implementation, the transceiver module 1101 is further configured to receive a second message, where the second message includes one or more of the following information: positioning precision information, battery capacity information of the terminal, and energy saving requirement information of the terminal.

In an optional implementation, the first indication information or the second message is carried in an LPP message, that is, carried in dedicated signaling between the terminal and the LMF.

It should be understood that in this embodiment of this application, the processing module 1102 may be implemented by a processor or a processor-related circuit component, and the transceiver module 1101 may be implemented by a transceiver or a transceiver-related circuit component.

In addition, it should be understood that the transceiver module 1101 in this embodiment of this application may be alternatively considered as including a receiving module and a sending module. The receiving module is configured to perform receiving-related steps performed by the transceiver module 1101 in the foregoing embodiment, and the sending module is configured to perform sending-related steps performed by the transceiver module 1101 in the foregoing embodiment. The transceiver in this embodiment of this application may alternatively be considered as a receiver and a transmitter. The receiver is configured to perform receiving-related steps performed by the transceiver in the foregoing embodiment, and the transmitter is configured to perform sending-related steps performed by the transceiver in the foregoing embodiment.

Figure 12:
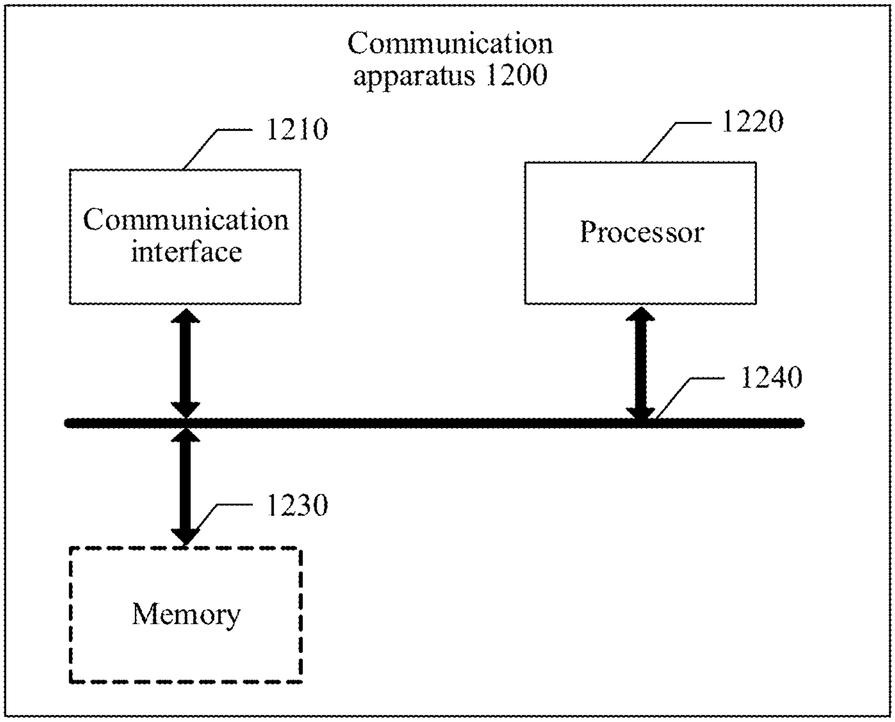
FIG. 12 is a schematic diagram of another structure of a communication apparatus according to an embodiment of this application.

FIG. 12 shows a communication apparatus 1200 according to an embodiment of this application. The communication apparatus 1200 may be a network device, and can implement a function of the network device in the method provided in embodiments of this application. Alternatively, the communication apparatus 1200 may be a terminal, and can implement a function of the terminal in the method provided in embodiments of this application. Alternatively, the communication apparatus 1200 may be a location management device, and can implement a function of the location management device in the method provided in embodiments of this application. Alternatively, the communication apparatus 1200 may be an apparatus that can support a network device, a terminal, or a location management device in implementing a corresponding function in the method provided in embodiments of this application. The communication apparatus 1200 may be a chip system. In this embodiment of this application, the chip system may include a chip; or may include a chip and another discrete component.

During hardware implementation, the transceiver module 1101 may be a transceiver, and the transceiver is integrated into the communication apparatus 1200 to form a communication interface 1210.

The communication apparatus 1200 includes at least one processor 1220. The processor 1220 may be a CPU, a microprocessor, an ASIC, or one or more integrated circuits configured to control program execution of the solutions in this application, and is configured to implement or support the communication apparatus 1200 in implementing the function of the network device, the terminal, or the location management device in the method provided in embodiments of this application. For details, refer to the detailed descriptions in the method example. Details are not described herein again.

The communication apparatus 1200 may further include at least one memory 1230, configured to store program instructions and/or data. The memory 1230 is coupled to the processor 1220. The coupling in embodiments of this application is indirect coupling or a communication connection between apparatuses, units, or modules, may be in an electrical form, a mechanical form, or another form, and is used for information exchange between the apparatuses, the units, or the modules. The processor 1220 may operate in collaboration with the memory 1230. The processor 1220 may execute the program instructions and/or the data stored in the memory 1230, so that the communication apparatus 1200 implements a corresponding method. The at least one memory may be included in the processor 1220.

The communication apparatus 1200 may further include a communication interface 1210, an apparatus such as any transceiver, to communicate with another device or communication network, such as a RAN, a wireless local area network (WLAN), or a wired access network. The communication interface 1210 is configured to communicate with another device through a transmission medium, so that an apparatus in the communication apparatus 1200 may communicate with the another device. For example, when the communication apparatus 1200 is the network device, the another device is the terminal or the location management function. Alternatively, when the communication apparatus is the terminal, the another device is the network device. The processor 1220 may send and receive data using the communication interface 1210. The communication interface 1210 may be a transceiver.

This embodiment of this application does not limit a specific connection medium between the communication interface 1210, the processor 1220, and the memory 1230. In this embodiment of this application, in FIG. 12, the memory 1230, the processor 1220, and the communication interface 1210 are connected through a bus 1240, and the bus is represented using a bold line in FIG. 12. A connection manner between other components is merely an example for description, and imposes no limitation. The bus may be classified into an address bus, a data bus, a control bus, and the like. For ease of representation, only one bold line indicates the bus in FIG. 12, but this does not mean that there is only one bus or only one type of bus.

In this embodiment of this application, the processor 1220 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware in the processor and a software module.

The memory 1230 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory 1230 is not limited thereto. The memory may exist independently and is connected to the processor through the bus 1240. The memory may alternatively be integrated with the processor.

The memory 1230 is configured to store computer-executable instructions for executing the solutions of this application, and the processor 1220 controls the execution. The processor 1220 is configured to execute the computer-executable instructions stored in the memory 1230, to implement the cell reselection method provided in the foregoing embodiments of this application.

Optionally, the computer-executable instructions in embodiments of this application may also be referred to as application program code. This is not specifically limited in embodiments of this application.

It should be noted that the communication apparatus in the foregoing embodiments may be a terminal, a circuit, a chip used in the terminal, or another combined component, component, or the like that has functions of the terminal. When the communication apparatus is the terminal, the transceiver module may be a transceiver, and may include an antenna, a radio frequency circuit, and the like. The processing module may be a processor, for example, a CPU. When the communication apparatus is a component that has functions of the terminal, the transceiver module may be a radio frequency unit, and the processing module may be a processor. When the communication apparatus is a chip or a chip system, the transceiver module may be an input/output interface of the chip or the chip system, and the processing module may be a processor of the chip or the chip system. It may be considered that an input interface of the chip or the chip system corresponds to the foregoing described receiving module, and an output interface of the chip or the chip system corresponds to the foregoing described sending module.

Figure 13:
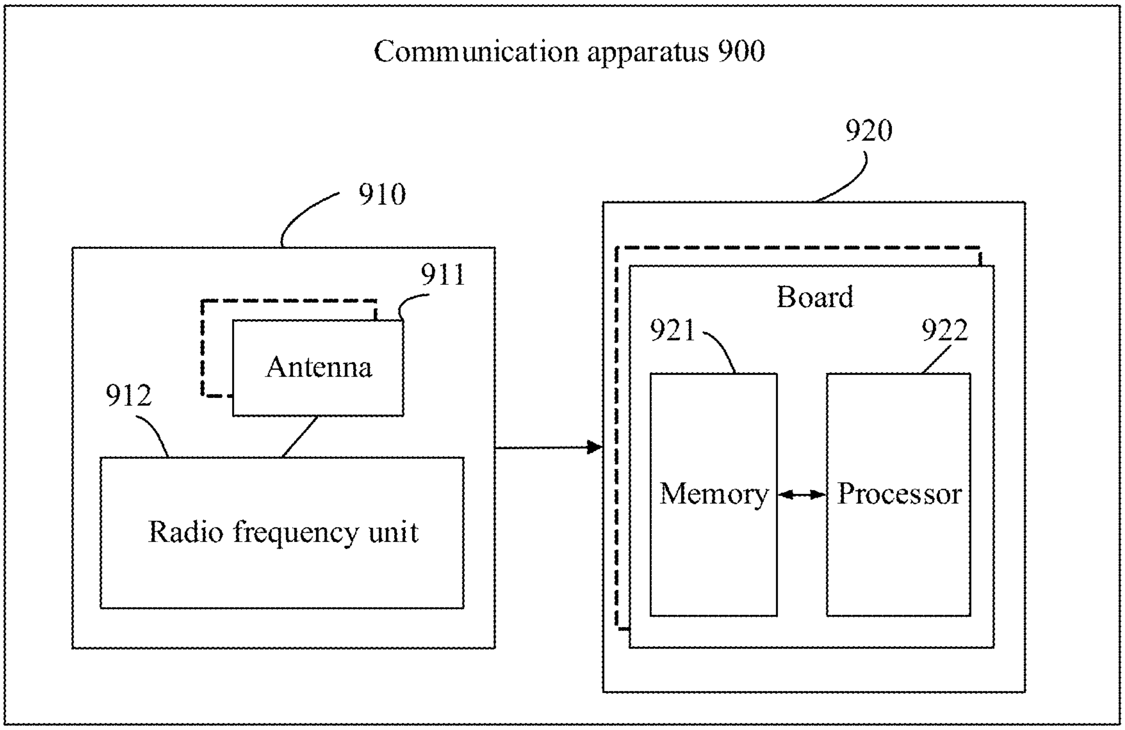
FIG. 13 is a schematic diagram of another structure of a first communication apparatus according to an embodiment of this application.

FIG. 13 is a schematic diagram of a simplified structure of a communication apparatus. For ease of understanding and illustration, an example in which the communication apparatus is a base station is used in FIG. 13. The base station may be used in the systems shown in FIG. 2 to FIG. 4, and may be the network device in FIG. 2 to FIG. 4 and perform a function of the network device in the foregoing method embodiments.

A communication apparatus 900 may include a transceiver 910, a memory 921, and a processor 922. The transceiver 910 may be used by the communication apparatus to perform communication, for example, configured to send or receive the foregoing indication information. The memory 921 is coupled to the processor 922, and may be configured to store a program and data that are necessary for implementing functions by the communication apparatus 900. The processor 922 is configured to support the communication apparatus 900 in performing the corresponding functions in the foregoing method. The functions may be implemented by invoking the program stored in the memory 921.

Specifically, the transceiver 910 may be a wireless transceiver, and may be configured to support the communication apparatus 900 in sending and receiving signaling and/or data through a radio air interface. The transceiver 910 may also be referred to as a transceiver unit or a communication unit. The transceiver 910 may include one or more radio frequency units 912 and one or more antennas 911. The radio frequency unit, for example, a remote radio unit (RRU) or an active antenna unit (AAU), may be configured to: transmit a radio frequency signal, and perform conversion between the radio frequency signal and a baseband signal. The one or more antennas may be configured to radiate and receive the radio frequency signal. Optionally, the transceiver 910 may include only the foregoing radio frequency unit. In this case, the communication apparatus 900 may include the transceiver 910, the memory 921, the processor 922, and the antenna.

The memory 921 and the processor 922 may be integrated together or may be independent of each other. As shown in FIG. 13, the memory 921 and the processor 922 may be integrated into a control unit 920 of the communication apparatus 900. For example, the control unit 920 may include a BBU of an LTE base station, and the baseband unit may also be referred to as a DU. Alternatively, the control unit 920 may include a DU and/or a CU in a base station in 5G and a future radio access technology. The control unit 920 may include one or more antenna panels. A plurality of antenna panels may jointly support a radio access network (for example, an LTE network) of a single access standard, or a plurality of antenna panels may separately support radio access networks (for example, an LTE network, a 5G network, and another network) of different access standards. The memory 921 and the processor 922 may serve one or more antenna panels. In other words, the memory 921 and the processor 922 may be separately disposed on each antenna panel. Alternatively, the plurality of antenna panels may share a same memory 921 and a same processor 922. In addition, a necessary circuit may be disposed on each antenna panel. For example, the circuit may be configured to implement coupling between the memory 921 and the processor 922. The transceiver 910, the processor 922, and the memory 921 may be connected to each other by using a bus (bus) structure and/or another connection medium.

Based on the structure shown in FIG. 13, when the communication apparatus 900 needs to send data, the processor 922 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 900, the radio frequency unit receives a radio frequency signal through the antenna, converts the radio frequency signal into a baseband signal, and outputs the baseband signal to the processor 922. The processor 922 converts the baseband signal into data, and processes the data.

Based on the structure shown in FIG. 13, the transceiver 910 may be configured to perform the steps performed by the transceiver module 1101, and/or the processor 922 may be configured to invoke instructions in the memory 921, to perform the steps performed by the processing module 1102.

Figure 14:
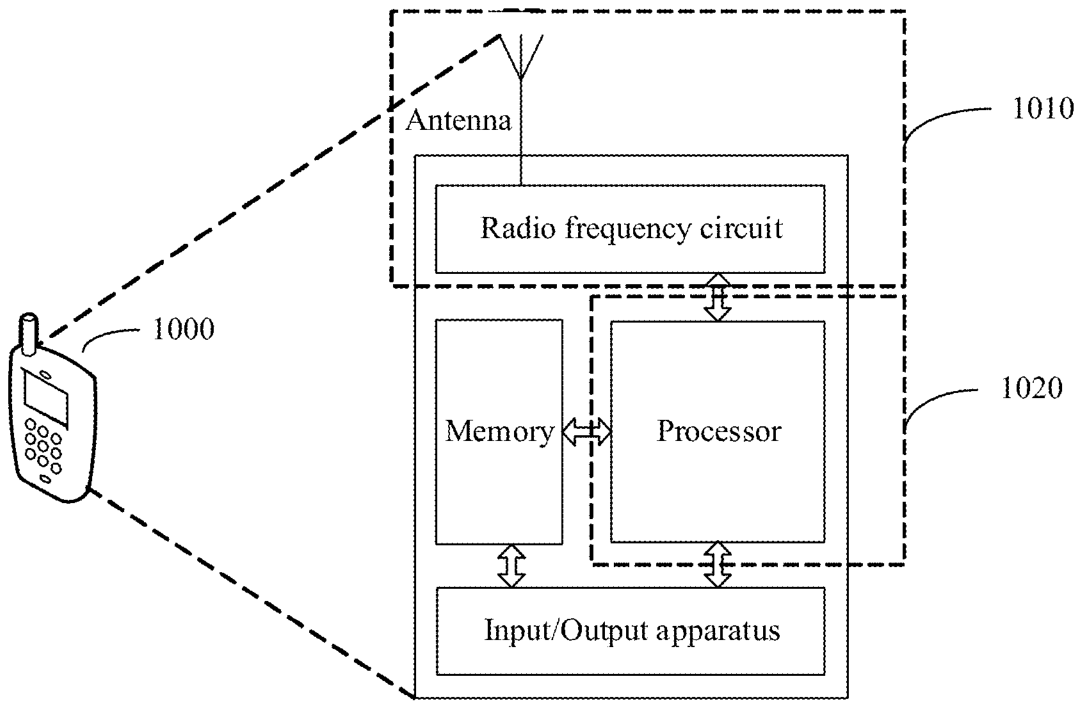
FIG. 14 is a schematic diagram of another structure of a second communication apparatus according to an embodiment of this application.

FIG. 14 is a simplified schematic diagram of a structure of a terminal. For ease of understanding and illustration, in FIG. 14, an example in which the terminal is a mobile phone is used. As shown in FIG. 14, the terminal includes a processor, a memory, a radio frequency circuit, an antenna, and an input/output apparatus. The processor is mainly configured to: process a communication protocol and communication data, control the on-board unit, execute a software program, and process data of the software program. The memory is configured to store the software program and the data. The radio frequency circuit is mainly configured to: perform conversion between a baseband signal and a radio frequency signal, and process the radio frequency signal. The antenna is mainly configured to send and receive radio frequency signals in a form of an electromagnetic wave. The input/output apparatus, for example, a touchscreen, a display screen, or a keyboard is mainly configured to: receive data entered by a user, and output data to the user. It should be noted that some types of devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the apparatus, and the processor having a processing function may be considered as a processing unit of the apparatus. As shown in FIG. 14, the apparatus 1000 includes a transceiver unit 1010 and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. In other words, the transceiver unit 1010 includes the receiving unit and the sending unit. The transceiver unit 1010 sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 1010 is configured to perform a sending operation and a receiving operation on a terminal side in the foregoing method embodiments, and the processing unit 1020 is configured to perform an operation, other than the sending and receiving operations, of the terminal in the foregoing method embodiments.

For example, in an implementation, the transceiver unit 1010 may be configured to perform steps related to sending and receiving in the embodiments shown in FIG. 5, FIG. 6, FIG. 7, and FIG. 10, and/or configured to support another process of the technology described in this specification. The processing unit 1020 is configured to perform processing-related steps in the embodiments shown in FIG. 5, FIG. 6, FIG. 7, and FIG. 10, and/or configured to support another process of the technology described in this specification.

When the communication apparatus is a chip-like apparatus or a circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. Specifically, the communication system includes a network device, a terminal, and a location management device, or may include more network devices, more terminals, and more location management devices. For example, the communication system includes a network device, a terminal, and a location management device that are configured to implement related functions in the embodiment in FIG. 5 or FIG. 6. For example, the communication system includes a network device and a terminal that are configured to implement related functions in FIG. 7 or FIG. 10.

The network device is configured to implement a related function of a network device part in embodiments of this application, for example, configured to implement the related function of the network device part in the embodiment shown in FIG. 5, FIG. 6, FIG. 7, or FIG. 10. The terminal is configured to implement a function of a related terminal part in embodiments of this application, for example, configured to implement the function of the related terminal in the embodiment shown in FIG. 5, FIG. 6, FIG. 7, or FIG. 10. The location management device is configured to implement the function of the location management device part related to FIG. 5 or FIG. 6. For details, refer to the related descriptions in the method embodiment. Details are not described herein again.

An embodiment of this application further provides a computer-readable storage medium, including instructions. When the instructions are run on a computer, the computer is enabled to perform the method performed by the network device, the terminal, or the location management device in the embodiment shown in FIG. 5, FIG. 6, FIG. 7, or FIG. 10.

An embodiment of this application further provides a computer program product, including instructions. When the instructions are run on a computer, the computer is enabled to perform the method performed by the network device, the terminal, or the location management device in the embodiment shown in FIG. 5, FIG. 6, FIG. 7, or FIG. 10.

An embodiment of this application provides a chip system. The chip system includes a processor, and may further include a memory, to implement the functions of the network device, the terminal, or the location management device in the foregoing methods. The chip system may include a chip; or may include a chip and another discrete component.

All or some of the methods provided in embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a special-purpose computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the protection scope of this application. This application is intended to cover these modifications and variations of this application provided that they fall within the scope of the claims of this application and their equivalent technologies.

What is claimed is:

1. A cell reselection method, comprising:

receiving, by a terminal, first indication information indicating one or more positioning areas, wherein each of the one or more positioning areas comprises a plurality of cells having same resource configuration information, and the resource configuration information is used to configure a reference signal resource;

receiving, by the terminal, indication information that notifies the terminal that a first target parameter of a first-type cell is greater than a second target parameter of a second-type cell and comprises an adjustment value, wherein the adjustment value is used for only increasing the first target parameter of the first-type cell while leaving the second target parameter of the second-type cell unchanged or only decreasing the second target parameter of the second-type cell while leaving the first target parameter of the first-type cell unchanged, thereby increasing priority difference between the first-type cell and the second-type cell, wherein the first-type cell comprises a serving cell and a cell that is in one or more neighboring cells of the serving cell and that belongs to the positioning area, and the second-type cell is a cell that is in the one or more neighboring cells of the serving cell and that does not belong to the positioning area; and performing, by the terminal in accordance with the first indication information, cell reselection to reselect a cell in the one or more positioning areas.

2. The method of claim 1, wherein the indication information is second indication information notifying the terminal that a priority of the first-type cell is higher than a priority of the second-type cell, a value of the first target parameter indicates a first priority of the first-type cell, and a value of the second target parameter indicates a second priority of the second-type cell.

3. The method of claim 2, the performing the cell reselection comprising:

determining, by the terminal in accordance with the first indication information, candidate cells that comprise the first-type cell and the second-type cell and belong to inter-frequency cells having different priorities or belong to inter-radio access technology (RAT) cells; and reselecting, by the terminal, the first-type cell having the higher priority in the candidate cells.

4. The method of claim 2, wherein the second indication information indicates that a priority of a frequency of the first-type cell is higher than a priority of a frequency of the second-type cell.

5. The method of claim 2, wherein the second indication information indicates that a priority of an identifier of the first-type cell is higher than a priority of an identifier of the second-type cell.

6. The method of claim 1, wherein the indication information is third indication information notifying the terminal that an R value of the first-type cell is greater than an R value of the second-type cell, the R value of the first-type cell is a ranking of the first-type cell, and the R value of the second-type cell is a ranking of the second-type cell.

7. The method of claim 6, wherein the performing the cell reselection to reselect the cell comprises:

determining, by the terminal, candidate cells that comprise the first-type cell and the second-type cell and belong to inter-frequency cells having a same priority or intra-frequency cells; and reselecting, by the terminal, the first-type cell having the larger R value in the candidate cells.

8. The method of claim 1, wherein the adjustment value is used to adjust the first target parameter of the first-type cell to satisfy a formula:

$$Rn=Q\text{meas},n-Q\text{offset}*N-Q\text{offset}_{temp}, \text{ wherein}$$

Rn represents the R value of the first-type cell, Qmeas,n represents a received signal strength value measured by the neighboring cell of the serving cell, Qoffset represents the reselection offset of the first-type cell, $\text{Qoffset}_{temp}$ represents the temporary offset of the first-type cell, and N is the adjustment value that is a real number greater than 0 and less than 1.

9. A cell reselection method, comprising:

determining, by a network device, one or more positioning areas, wherein each of the one or more positioning areas comprises a plurality of cells, and the plurality of cells in the positioning area use same resource configuration information;

sending, by the network device to a terminal, first indication information indicating the one or more positioning areas for cell reselection; and sending, by the network device to the terminal, indication information that notifies the terminal that a first target parameter of a first-type cell is greater than a second target parameter of a second-type cell and comprises an adjustment value, wherein the adjustment value is used for only increasing the first target parameter of the first-type cell while leaving the second target parameter of the second-type cell unchanged or only decreasing the second target parameter of the second-type cell while leaving the first target parameter of the first-type cell unchanged, thereby increasing priority difference between the first-type cell and the second-type cell, wherein the first-type cell comprises a serving cell and a cell that is in one or more neighboring cells of the serving cell and that belongs to the positioning area, and the second-type cell is a cell that is in the one or more neighboring cells of the serving cell and that does not belong to the positioning area.

10. The method of claim 9, wherein the indication information is second indication information notifying the terminal that a priority of the first-type cell is higher than a priority of the second-type cell.

11. The method of claim 10, wherein the second indication information indicates that a priority of a frequency of the first-type cell is higher than a priority of a frequency of the second-type cell.

12. The method of claim 10, wherein the second indication information indicates that a priority of an identifier of the first-type cell is higher than a priority of an identifier of the second-type cell.

13. The method of claim 10, wherein the second indication information is carried in a system information block (SIB), a position system information block (Pos SIB), or a radio resource control (RRC) message.

14. The method of claim 9, wherein the indication information is third indication information notifying the terminal that an R value of the first-type cell is greater than an R value of the second-type cell, the R value of the first-type cell is a ranking of the first-type cell, and the R value of the second-type cell is a ranking of the second-type cell.

15. The method of claim 14, wherein the adjustment value is used to adjust the first target parameter of the first-type cell to satisfy a formula:

$$Rn=Q\text{meas},n-Q\text{offset}*N-\text{Qoffset}_{temp}, \text{ wherein}$$

Rn represents the R value of the first-type cell, Qmeas,n represents a received signal strength value measured by the neighboring cell of the serving cell, Qoffset represents the reselection offset of the first-type cell, $\text{Qoffset}_{temp}$ represents the temporary offset of the first-type cell, and N is the adjustment value that is a real number greater than 0 and less than 1.

16. The method of claim 14, wherein the third indication information is carried in a system information block (SIB), a position system information block (Pos SIB), or a radio resource control (RRC) message.

17. A communication apparatus, comprising:

a memory storing program instructions; and a processor, coupled to the memory and configured to execute the program instructions to cause the communication apparatus to:

receive first indication information indicating one or more positioning areas, wherein each of the one or more positioning areas comprises a plurality of cells having same resource configuration information, and the resource configuration information is used to configure a reference signal resource;

receive indication information that notifies the communication apparatus that a first target parameter of a first-type cell is greater than a second target parameter of a second-type cell and comprises an adjustment value, wherein the adjustment value is used for only increasing the first target parameter of the first-type cell while leaving the second target parameter of the second-type cell unchanged or only decreasing the second target parameter of the second-type cell while leaving the first target parameter of the first-type cell unchanged, thereby increasing priority difference between the first-type cell and the second-type cell, wherein the first-type cell comprises a serving cell and a cell that is in one or more neighboring cells of the serving cell and that belongs to the positioning area, and the second-type cell is a cell that is in the one or more neighboring cells of the serving cell and that does not belong to the positioning area; and perform cell reselection in accordance with the first indication information, to reselect a cell in the one or more positioning areas.

18. The communication apparatus of claim 17, wherein the indication information is second indication information notifying the communication apparatus that a priority of the first-type cell is higher than a priority of the second-type cell.

19. The communication apparatus of claim 18, wherein the communication apparatus is further caused to:

determine candidate cells that comprise the first-type cell and the second-type cell and belong to inter-frequency cells having different priorities or belong to inter-radio access technology (RAT) cells; and reselect the first-type cell having the higher priority in the candidate cells.

20. The communication apparatus of claim 17, wherein the adjustment value is used to adjust the first target parameter of the first-type cell to satisfy a formula:

$$Rn = Q\text{meas},n - Q\text{offset}*N - Q\text{offset}_{temp},$$ wherein

Rn represents the R value of the first-type cell, Qmeas,n represents a received signal strength value measured by the neighboring cell of the serving cell, Qoffset represents the reselection offset of the first-type cell, $\text{Qoffset}_{temp}$ represents the temporary offset of the first-type cell, and N is the adjustment value that is a real number greater than 0 and less than 1.

* * * * *